United States Patent [19]
Tani

[11] Patent Number: 6,072,761
[45] Date of Patent: Jun. 6, 2000

[54] OPTICAL STORAGE APPARATUS HAVING AN AUTOMATIC LASER POWER CONTROL WITH LIGHT EMISSION FINE CONTROL

[75] Inventor: Hiroshi Tani, Kawasaki, Japan

[73] Assignee: Fujitsu Limited, Kawasaki, Japan

[21] Appl. No.: 09/022,800

[22] Filed: Feb. 13, 1998

[30] Foreign Application Priority Data

Aug. 28, 1997 [JP] Japan ............................ 9-232159

[51] Int. Cl.⁷ ....................................... G11B 7/00
[52] U.S. Cl. .................... 369/116; 369/54; 369/58
[58] Field of Search ........................ 369/116, 13, 54, 369/58, 121, 100, 110; 360/59, 114

[56] References Cited

U.S. PATENT DOCUMENTS 5,398,227  3/1995  Miyaoka et al. ..................... 369/116
5,450,383  9/1995  Call et al. ............................ 369/116
5,790,491  8/1998  Jaquette et al. ....................... 369/54

FOREIGN PATENT DOCUMENTS 62-114129   5/1987   Japan .
329126      2/1991   Japan .
08129753    5/1996   Japan .

Primary Examiner—Ali Neyzari
Assistant Examiner—Kim-Kwok Chu
Attorney, Agent, or Firm—Greer, Burns & Crain, Ltd.

[57] ABSTRACT

A light emission fine adjustment processing unit of an optical storage apparatus brings a light beam to a test zone in an on-track state, sequentially instructs testing powers at two points to a light emission current source circuit, allows a laser diode to emit light, simultaneously instructs a subtraction current of the testing powers at two points to a subtraction current source circuit, and adjusts an instruction value so that a measuring power of a monitor power measuring unit is equal to the instructed testing power. An automatic power control holding unit holds an automatic power control unit at the time of the light emission of the laser diode. A test zone confirming unit activates a light emission adjustment process when the present position lies within a range of the test zone, and prevents a breakage of user data when the present position is out of the test zone range. A light emission timing control unit allows the light emission to be performed in only a data field while avoiding an ID field of a sector.

29 Claims, 33 Drawing Sheets

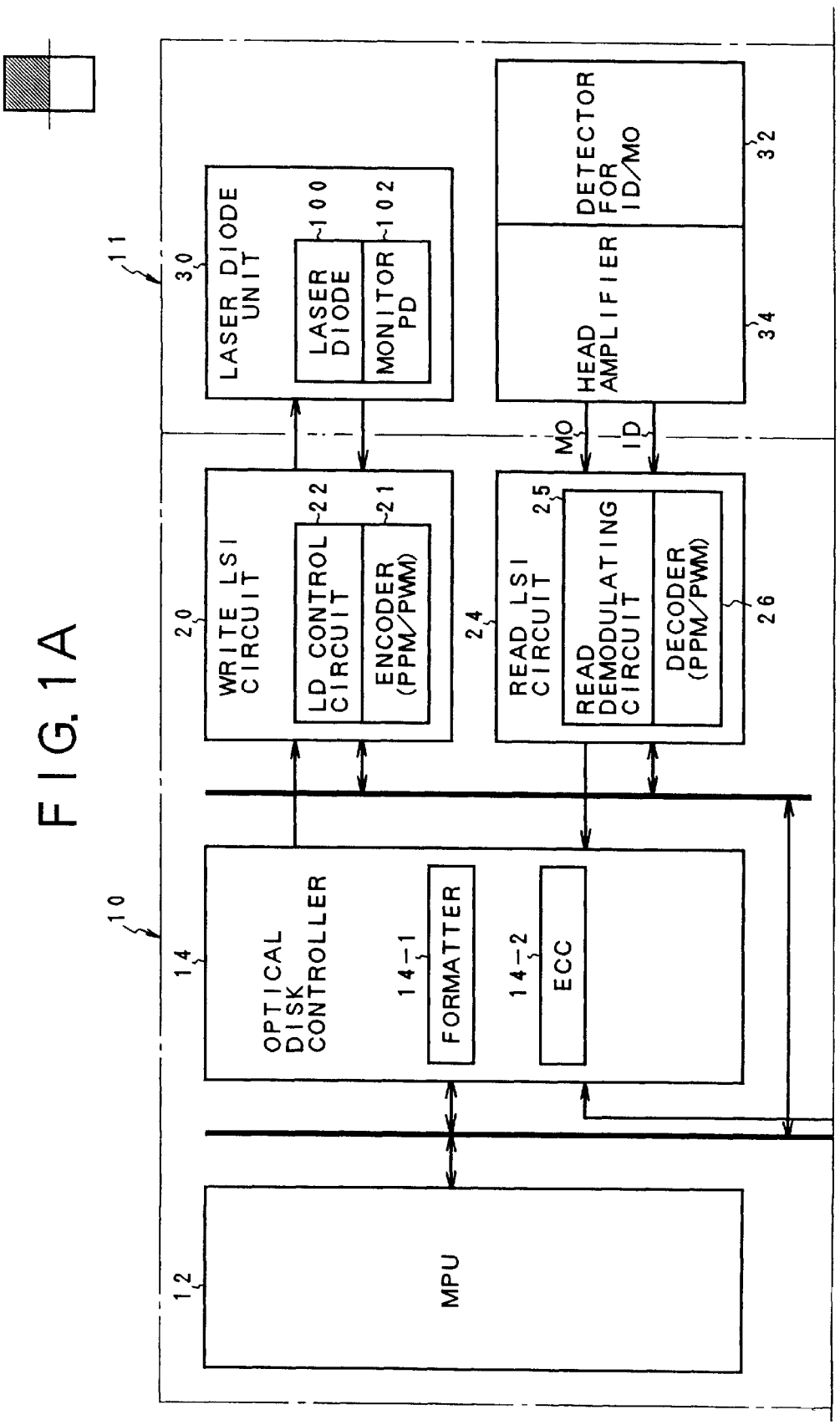

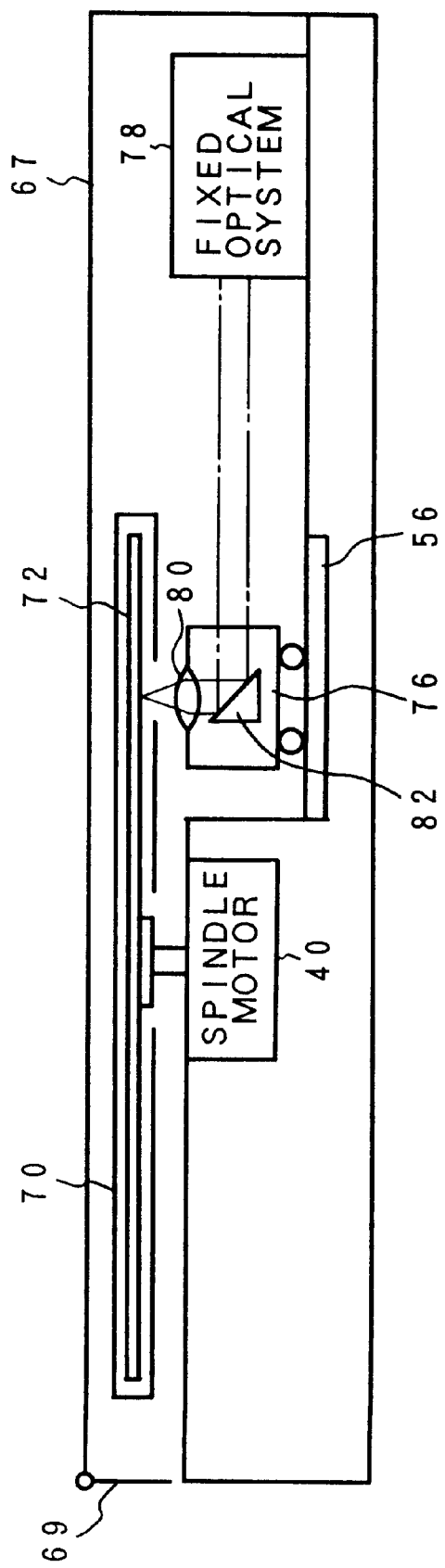

F I G. 5
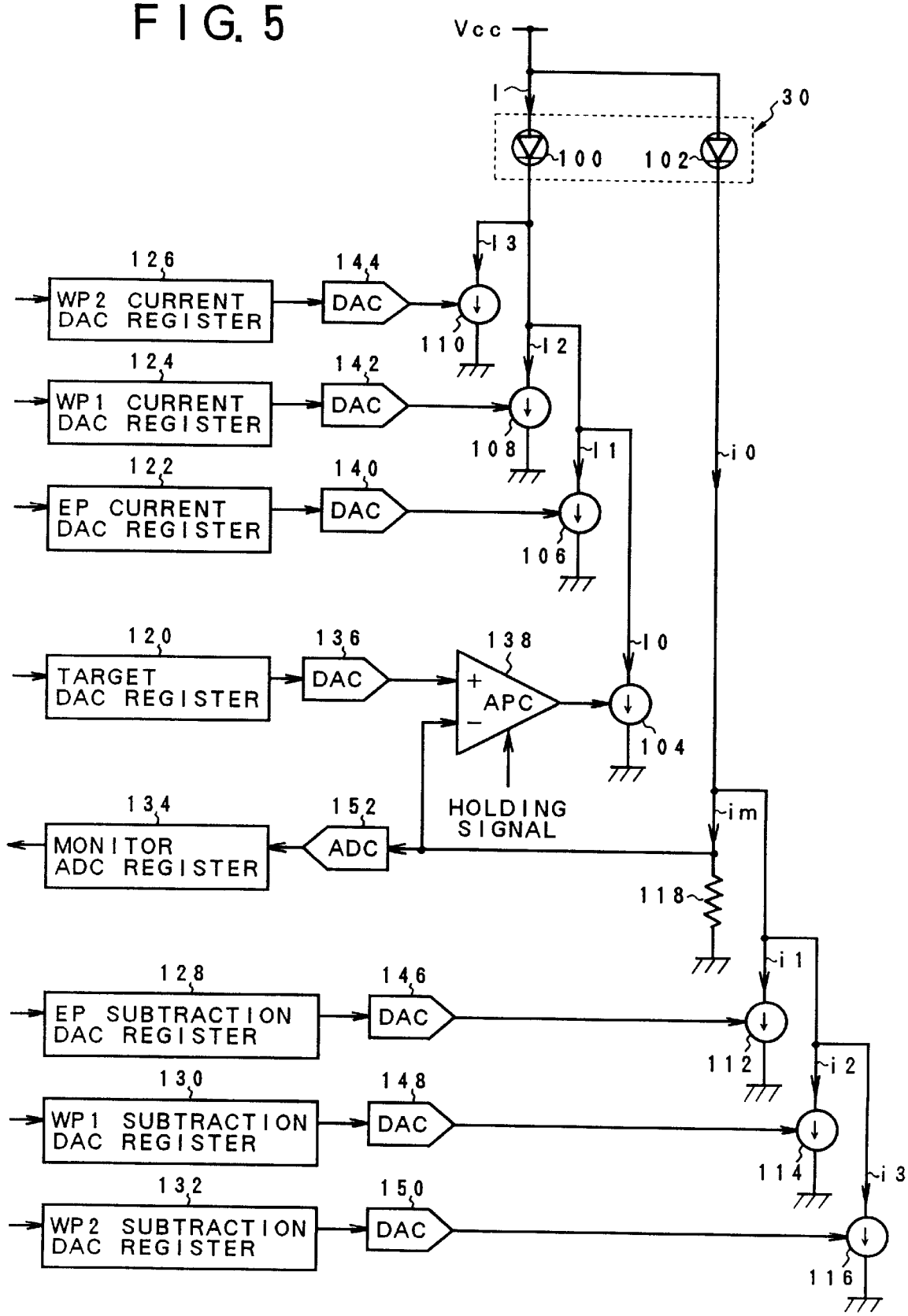

FIG. 6A WRITE GATE
FIG. 6B WRITE DATA
FIG. 6C WRITE CLOCK
FIG. 6D PULSE WIDTH DATA
FIG. 6E ASSIST PULSE (FOR AP)
FIG. 6F FIRST WRITE PULSE (FOR WP1)
FIG. 6G SECOND WRITE PULSE (FOR WP2)
FIG. 6H LIGHT EMITTING CURRENT/POWER
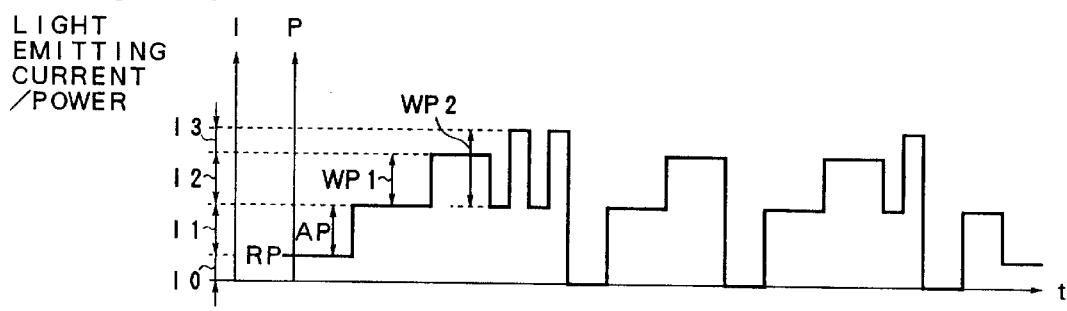
FIG. 6I SUBTRACTION CURRENT
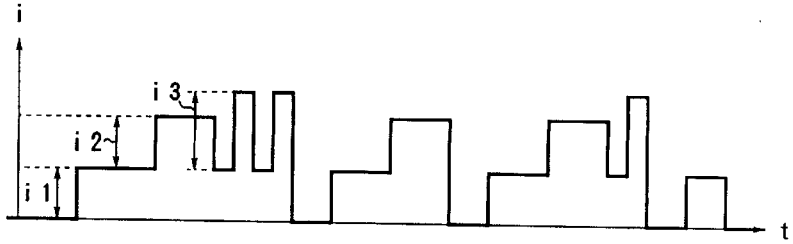
FIG. 6J MONITOR CURRENT $i_m$ ($i_0 - (i_1 + i_2 + i_3)$)
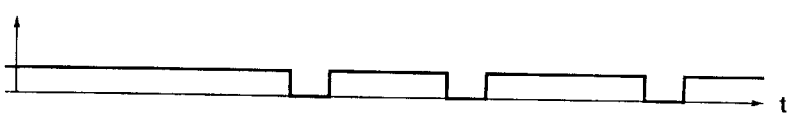

FIG. 7A WRITE GATE
FIG. 7B WRITE DATA
FIG. 7C WRITE CLOCK
FIG. 7D PULSE WIDTH DATA
FIG. 7E ASSIST PULSE (FOR AP)
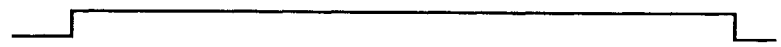
FIG. 7F FIRST WRITE PULSE (FOR WP1)
FIG. 7G SECOND WRITE PULSE (FOR WP2)
FIG. 7H LIGHT EMITTING CURRENT
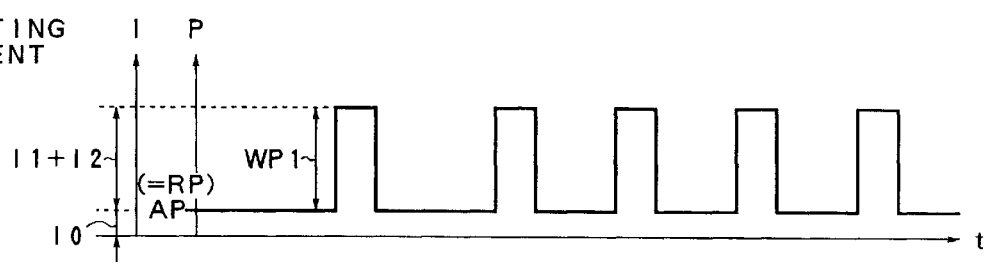
FIG. 7I SUBTRACTION CURRENT
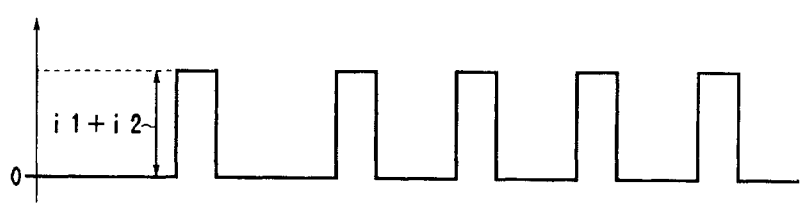
FIG. 7J MONITOR CURRENT $i_m$ $(= i_0 - (i_1 + i_2))$
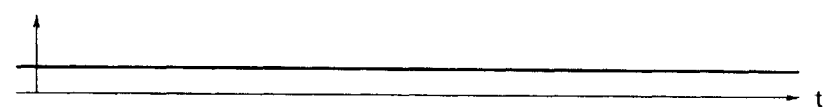

F I G. 13

| DAC NAME | INCLINATION | y AXIS CROSS POINT |
|---|---|---|
| ADC FOR APC | a0 | b0 |
| ADC FOR ERASING/ASSISTING | a1 | b1 |
| ADC FOR ERASING/ASSISTING SUBTRACTION | c1 | d1 |
| ADC FOR RECORDING | a2 | a2 |
| ADC FOR RECORDING SUBTRACTION | c2 | d2 |
| ADC FOR HIGH POWER RECORDING | a3 | b2 |
| ADC FOR HIGH POWER RECORDING SUBTRACTION | c3 | d3 |

F I G. 14

| ZONE NAME | RADIAS POSITION [mm] | TRACK NUMBER |
|---|---|---|
| TEST ZONE | 23.53 ~ 23.75 | -292 ~ -17 |
| CONTROL TRACK ZONE | 23.97 ~ 24.00 | -16 ~ -1 |
| DATA ZONE (USER ZONE) | 24.00 ~ 40.00 | 0 ~ 9999 |
| CONTROL TRACK ZONE | 40.00 ~ 40.02 | 10000 ~ 10015 |

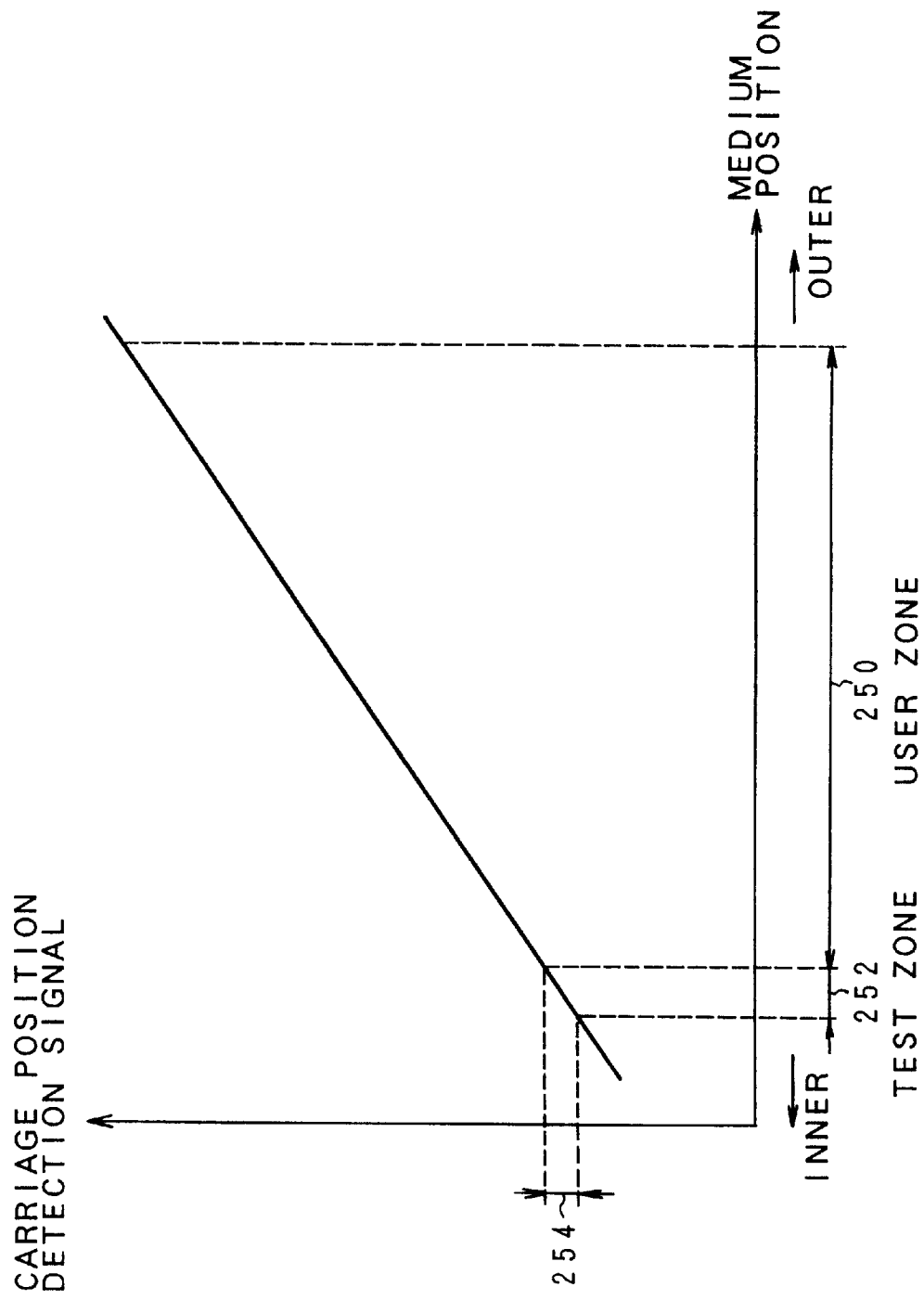

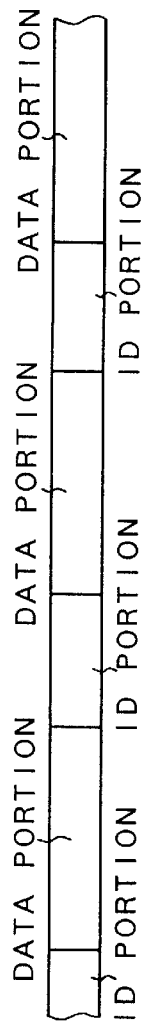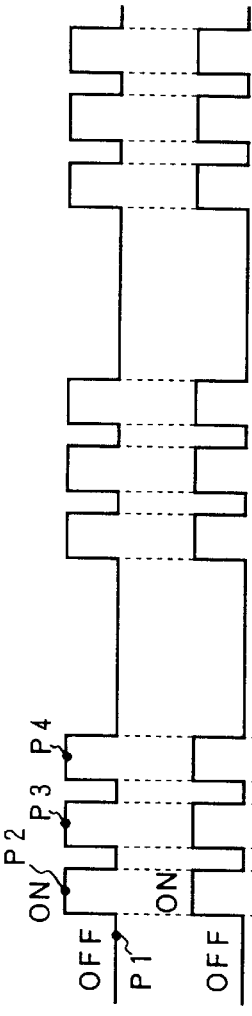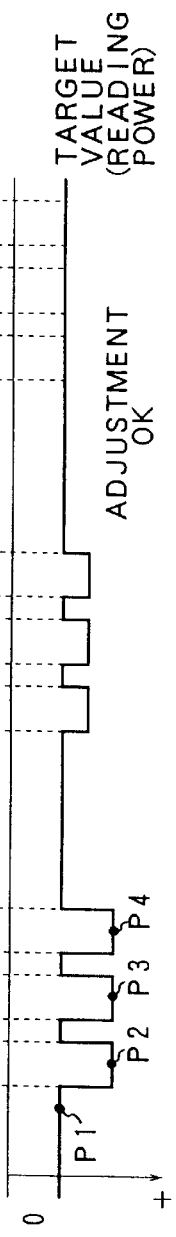
FIG. 16A SECTOR INFORMATION
FIG. 16B ID DETECTION SIGNAL
FIG. 16C WRITE GATE SIGNAL
FIG. 16D APC HOLDING SIGNAL
FIG. 16E SUBTRACTION DAC VALUE FOR ERASING POWER
FIG. 16F LIGHT EMITTING DAC VALUE FOR ERASING POWER
FIG. 16G MONITOR ADC VALUE

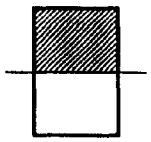
FIG. 17A
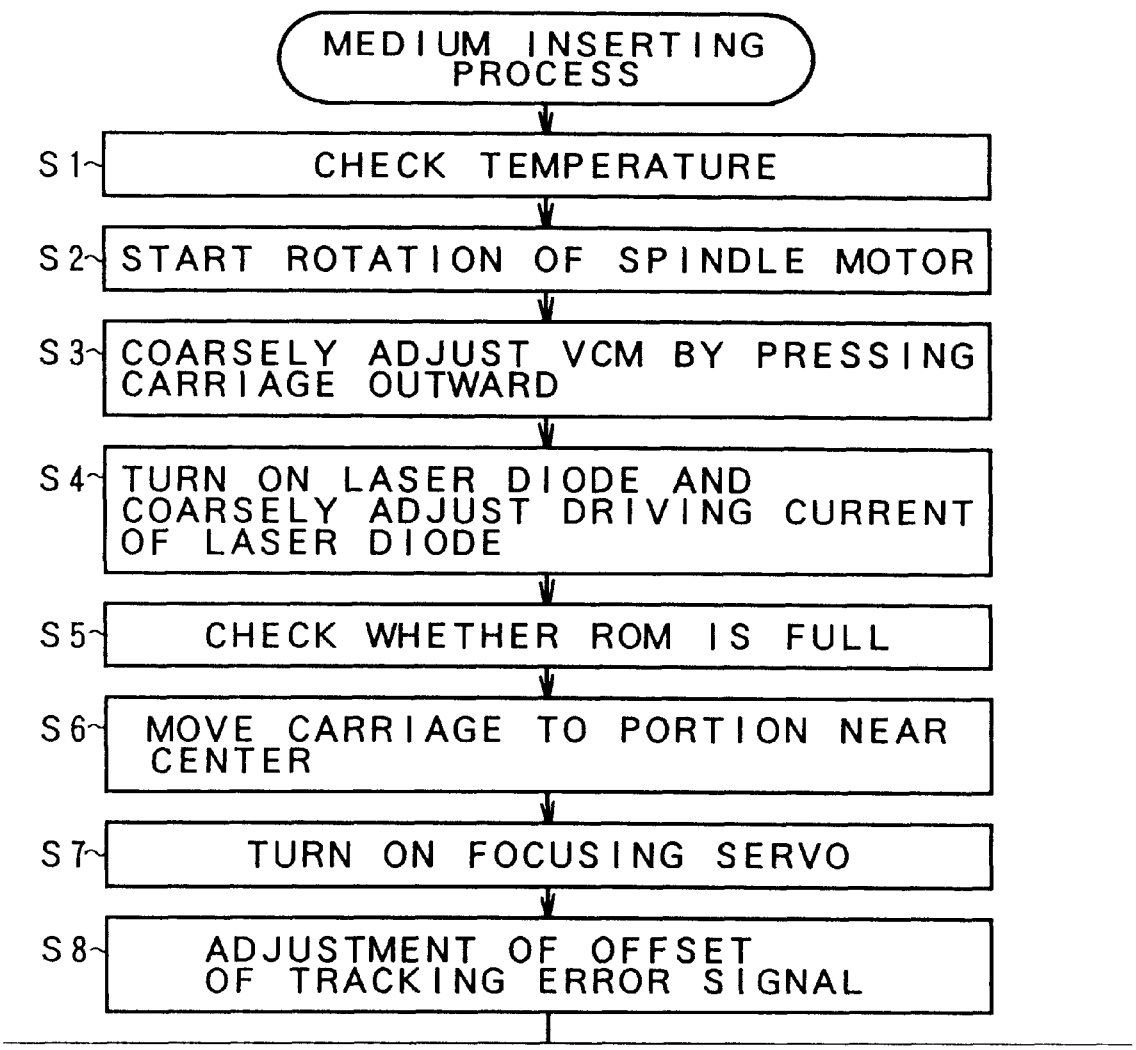

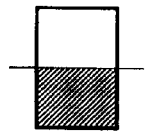
FIG. 17B
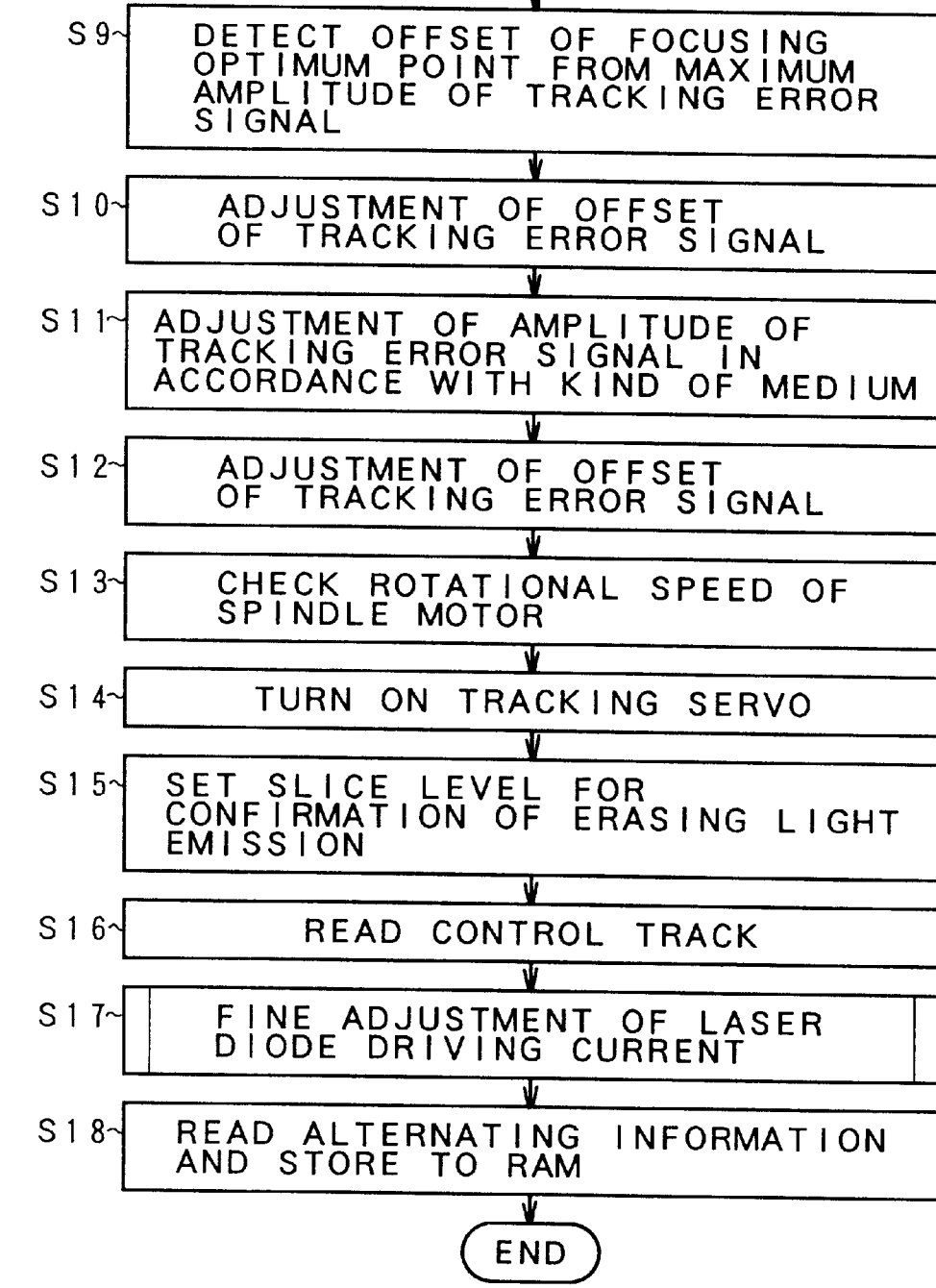

FIG. 22

FIRST WRITING POWER FINE ADJUSTMENT

S1:
(1) SET RELATIONAL EQUATION ($y = a1 \cdot x + b1$) OF DAC VALUE AND RELATIONAL EQUATION ($z = c1 \cdot x + d1$) OF SUBTRACTION DAC VALUE OBTAINED BY LIGHT EMISSION FINE ADJUSTMENT OF ERASING POWER EP
(2) SET RELATIONAL EQUATION ($y = a2 \cdot x + b2$) OF LIGHT EMISSION DAC VALUE AND RELATIONAL EQUATION ($z = c2 \cdot x + d2$) OF SUBTRACTION DAC VALUE OBTAINED BY COARSE ADJUSTMENT OF FIRST WRITING POWER WP1

S2: ASSUME THAT WP1 + EP = 3mA + 2mA = 5mA
(1) CALCULATE LIGHT EMISSION DAC VALUE AND SUBTRACTION DAC VALUE OF (WP1 = 3mA)
(2) CALCULATE LIGHT EMISSION DAC VALUE AND SUBTRACTION DAC VALUE OF (EP = 2mA)
(3) CLEAR LIGHT EMISSION DAC VALUE AND SUBTRACTION DAC VALUE OF WP2

S3: SET THE NUMBER (n) OF TIMES OF LOOP FOR AVERAGING

S4: SET ID DETECTION TIMER VALUE AND START

S5: ID IS DETECTED ?
- NO → S6: TIME-OUT?
  - NO → (back to S5)
  - YES → ABNORMAL END
- YES → S7: READ ID S8: WITHIN RANGE OF TEST ZONE?
- NO → S9: SEEK TO TEST ZONE → (back to S3)
- YES → S10

S10: SET THE NUMBER (m) OF TIMES OF LOOP FOR LIGHT EMISSION IN ONE SECTOR

S11: LIGHT EMISSION WHEN WRITE GATE IS TURNED ON

S12: READ MONITOR ADC VALUE (y)

(2) (1) (3) (4)

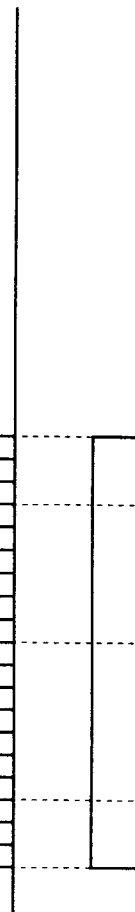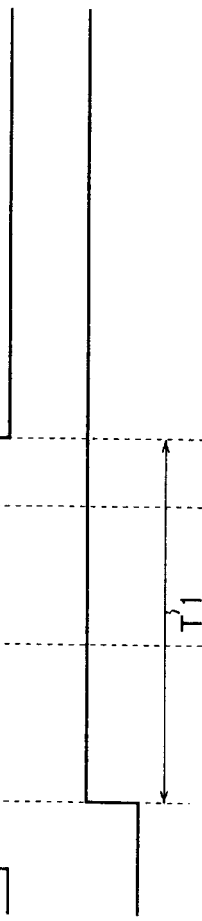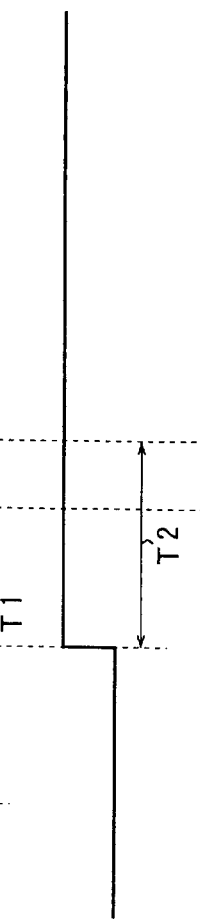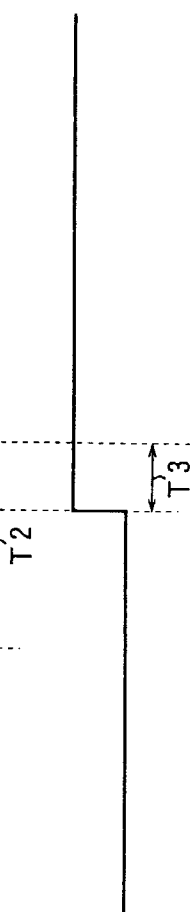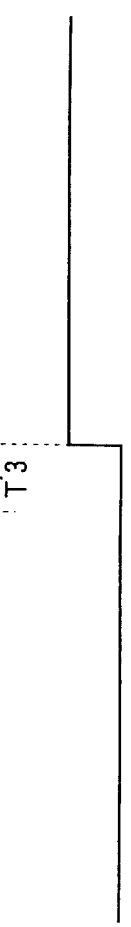
FIG. 28A SECTOR INFORMATION
FIG. 28B ID SIGNAL
FIG. 28C RF DETECTION SIGNAL
FIG. 28D SECTOR MARK DETECTION SIGNAL
FIG. 28E FIRST ADDRESS MARK DETECTION SIGNAL
FIG. 28F SECOND ADDRESS MARK DETECTION SIGNAL
FIG. 28G ID DETECTION COMPLETION SIGNAL

OPTICAL STORAGE APPARATUS HAVING AN AUTOMATIC LASER POWER CONTROL WITH LIGHT EMISSION FINE CONTROL

BACKGROUND OF THE INVENTION

The present invention relates to an optical storage apparatus using a removable medium such as an MO cartridge or the like and, more particularly, to an optical storage apparatus for efficiently adjusting a light emitting power of a laser diode to an optimum power when a medium is loaded.

Use of an optical disk as a storage medium in a multimedia has rapidly been developing in recent years. For example, in addition to conventional 3.5 MO cartridges of 128 MB and 230 MB, media of a high density recording such as MO cartridges of 540 MB and 640 MB have also been introduced in recent years. In an optical disk drive, it is important to properly set the light emitting power of a laser diode in accordance with a temperature at that time, the kind of medium, the position (zone) on the medium, and the like in order to stably perform the reading and writing operations. Generally, when a temperature is high, the necessary light emitting power is low, and when the temperature is low, the necessary light emitting power is high. The media can be divided into the kind of media having 128 MB and 230 MB and recorded by a pit position modulation (PPM), and the kink of media having 540 MB and 640 MB recorded by a pulse width modulation (PWM) in order to raise the recording density. In the PPM recording, the light emitting power is changed at each of three stages of reading, erasing, and recording. In the PWM recording, it is necessary to change the light emitting power at each of four stages of reading, erasing, first writing, and second writing. When PWM recording a medium of a direct overwrite corresponding type, since no erasing operation is executed, it is necessary to change the light emitting power at four stages of reading assisting first writing and second writing. Further, with respect to a position on a medium, a larger light emitting power is necessary on the outer circumference than that on the inner circumference.

SUMMARY OF THE INVENTION

In an optical disk apparatus, it is necessary to set an optimum light emitting power in accordance with a situation. In a light emission control of a laser diode, instruction data of the light emitting power is input to a D/A converter by a controller and is converted into an analog signal A current source is controlled by the analog signal, and a driving current is supplied to the laser diode, thereby emitting light. In this case, it is important that the optimum light emitting power instructed by the controller and a light emitting power of the laser diode which actually emit the light coincide. For this purpose, when a medium is inserted into the optical disk apparatus, a light emission adjustment for accurately setting the relation between a DAC instruction value serving as light emission instruction data for the D/A converter and the light emitting power of the laser diode based on the DAC instruction value is executed. As a light emission adjustment of the laser diode, there are a light emission coarse adjustment and a light emission fine adjustment. According to the light emission coarse adjustment, in a state where a focusing servo and a tracking servo are turned off, an ADC instruction value is set in the D/A converter, the laser diode is driven so as to emit light, a monitor light is measured by an A/D converter, and the DAC instruction value is adjusted so that the measured power coincides with the instruction power. In this case, since the monitor light to be measured does not include a return light from the medium, a statistic adjustment different from the actual reading and writing operations is executed. In contrast, in the light emission fine adjustment, an on-track control state where the focusing servo and the tracking servo are turned on, that is, a state in which the same monitor light as that used in the actual reading and writing operations includes the medium return light. The DAC instruction value corresponding to the optimum power is set in the D/A converter on the basis of the relation between the light emitting power obtained by the coarse adjustment and the DAC instruction value, and the laser diode is driven so as to emit light. The monitor light including the return light from the medium is measured and the DAC value is adjusted so that the measured power coincides with the instructed light emitting power, thereby accurately adjusting the relation between the light emitting power and the DAC instruction value.

In the light emission fine adjustment of the laser diode which is executed in the on-track control state, since the laser diode is driven so as to emit light by the writing and erasing powers, the existing recorded data gets written over or. Consequently, for the light emission fine adjustment, for example, a test zone of an innermost non-user area in which no user data is recorded is used. That is, when the light emission fine adjustment is started, a carriage is sought to the test zone, completion of the seeking operation to the test zone is confirmed, and the light emission adjustment of the laser diode is executed. For example, in the PWM recording medium which requires the erasing operation, with respect to each of the erasing power, the first writing power, and the second writing power, the light emission adjustment is sequentially executed on the spiral tracks while maintaining the on-track state. In the PWM recording medium of the direct overwrite corresponding type which does not need the erasing operation, with respect to each of the first writing power which is added to an assisting power and the second writing power which is added to the assisting power, the light emission adjustment is sequentially performed on the spiral tracks while maintaining the on-track state. In the case where the light beam is brought to the track in the middle of the test zone and the light emission adjustment is started, however, the number of remaining tracks in the test zone may be insufficient, which could cause the light to be emitted beyond the test zone during the light emission adjustment and the data in a control track arranged in a system area or the user zone to be destroyed.

In the light emission fine adjustment, although the apparatus is controlled so as to enter the on-track state in the test zone and the laser diode is light emission driven, the actual writing operation or the like of test data is not performed. The light emission is, therefore, adjusted without especially being aware of a sector structure of the track constructed by an ID portion and a data portion. In the case where the DAC instruction value corresponding to the erasing or writing light emitting power is set in the D/A converter and the laser diode is light emission driven, even if the DAC instruction value is constant, a phenomenon such that the measured power of the monitor light measured by the A/D converter partially fluctuates is seen, so that there is a problem of the occurrence of an adjustment error.

According to the invention, there is provided an optical storage apparatus which can prevent a situation when the light is emitted beyond a test zone during a light emission adjustment in an on-track control state and destroy the recorded data.

According to the invention, an optical storage apparatus which can accurately adjust a light emission without causing an adjustment error even if there is a fluctuation in a measured power of monitor light by a light emission in an on-track state is provided.

An optical storage apparatus of the invention includes a laser diode for emitting beam light; a light emission current source circuit for supplying a driving current according to each of a plurality of powers to the laser diode; an automatic power control unit (APC unit) for controlling the light emitting power of the laser diode to a specified target power; a monitoring detector for receiving the laser beam of the laser diode and detecting a measuring power; and a monitoring power measuring unit for reading a monitor current obtained from the detector for monitoring as a power measurement value.

According to the invention, such an optical storage apparatus further includes a light emission fine adjustment processing unit, an automatic power control holding unit, and a test zone confirming unit. After the light beam is brought to a predetermined test zone, the light emission fine adjustment processing unit sequentially instructs a light emission at a predetermined test power in a state where an on-track control is validated to the light emission current source circuit, drives the laser diode so as to emit light, adjusts an instruction value of the light emission current source circuit so that the measuring power is equal to the target power, and obtains the relation between an arbitrary light emitting power (x) and an instruction value (y) of the light emission current source circuit on the basis of the result of the adjustment. For example, the relation between the arbitrary light emitting power (x) and the instruction value (y) of the light emission current source circuit is obtained by a linear approximation and corrects a power table which has been initially set. The automatic power control holding unit holds the control of the automatic power control unit for a light emission driving period when the laser diode is light emission driven by the light emission fine adjustment processing unit. The automatic power light emission control is not consequently executed during the light emission of the laser diode, so that an error of the light emitting power by the return light is accurately measured and the instruction value for the light emission current source circuit can be adjusted so as to eliminate the error. The test zone confirming unit discriminates whether the present position lies within a range of the test zone or not when the adjustment of the light emission of the laser diode by the light emission fine adjustment processing unit is started. When the present position lies within the range of the test zone, the light emission adjustment is activated. As mentioned above, the present position on the medium is confirmed any time during the light emission adjustment, and when it is out of the test zone range, a breakage of the user data is prevented by again seeking the light beam to the head of the test zone.

In a specific form of the invention, a subtraction current source circuit is further provided. A specified subtraction current corresponding to a difference between the light emitting power and the target power is subtracted from a photosensing current of the detector for monitoring. The resultant current is converted into a monitor current. The monitor current is fed back to the automatic power control unit. In this case, the monitor power measuring unit reads the monitor current obtained from the subtraction current source circuit as a power measurement value. After the light beam is brought to a predetermined test zone, the light emission fine adjustment processing unit sequentially instructs the light emission current source circuit so as to perform the light emission by testing powers at least two predetermined points in a state where the on-track control is validated. The light emission fine adjustment processing unit then drives the laser diode so as to emit light, instructs a specified subtraction current corresponding to the testing powers at the two points to the subtraction current source circuit, adjusts the instruction value of the light emission current source circuit so that the measuring power of the monitor power measuring unit is equal to the target power, and obtains the relation between the arbitrary light emitting power and the instruction value of the light emission current source circuit on the basis of the result of the adjustment.

The test zone confirming unit discriminates whether the present position is within the range of the track zone or not by reading an ID field of the medium track. The test zone confirming unit can also discriminate whether the present position is within the range of the track zone or not by detecting an absolute position of a positioner (VCM carriage) for moving an image forming position of the light beam in the radial direction of the medium by a position sensor. When the present position is out of the test zone range, the test zone confirming unit allows the operation for seeking the test zone to be again executed. When the present position cannot be recognized, the test zone confirming unit inhibits the light emission adjustment of the laser diode. As items for recognizing the present position, the test zone confirming unit has an item of the reading of the ID field of the medium track and an item of the absolute position of the positioner for moving the image forming position of the light beam of an object lens detected by the position sensor in the radial direction of the medium. Any one of the plurality of items is selected and the present position is recognized. When the present position cannot be recognized by the selected item, it is desirable to switch the item to the other item and recognize the present position. The light emission fine adjustment processing unit and the test zone confirming unit execute the light emission fine adjustment of the laser diode accompanying the confirmation of the test zone by the initial operation just after the insertion of a medium cartridge. The light emission fine adjustment processing unit and the test zone confirming unit also execute the light emission fine adjustment of the laser diode accompanying the confirmation of the test zone by the retrying operation. Further, in a state where no command is issued from an upper apparatus, the light emission fine adjustment processing unit and the test zone confirming unit perform the light emission fine adjustment of the laser diode accompanying the confirmation of the test zone at predetermined time intervals. When the medium loaded into the apparatus is a recording medium of the pit position modulation (PPM), the light emission fine adjustment processing unit adjusts each of an erasing power EP and a first writing power WP1. When the medium loaded into the apparatus is a recording medium of the pulse width modulation (PWM), the light emission fine adjustment processing unit adjusts each of the erasing power EP, the first writing power WP1, and a second writing power WP2.

In another embodiment of the optical storage apparatus of the invention, in addition to the light emission fine adjustment processing unit and the automatic power control holding unit, a light emission timing control unit is provided. When the light emission of the laser diode is adjusted by the light emission fine adjustment processing unit, the light emission timing control unit allows the light emission adjustment of the laser diode to be performed only in a data field by avoiding the ID field with respect to each of the track sectors which are on-track controlled.

When the laser diode is light emission driven by setting the instruction value corresponding to the erasing or writing light emitting power into the light emission current source circuit by the light emission fine adjustment processing unit, even if the instruction value is constant, the measuring power of the monitor light measured by the monitor power measuring unit partially fluctuates and causes an adjustment error is caused. The inventors of the present invention investigated causes and it was found that the return lights from the medium to the detector for monitoring in the on-track control state differ in the ID field and the data field of the track sector. That is, information has been recorded by physical pits in the ID field. On the other hand, information has been magnetooptically recorded by pits in the data field, so that the recording surface is a mirror surface. The return light from the ID field is, therefore, fluctuated by being influenced by the convex and concave portions of the physical pits which cause the adjustment error. In the light emission fine adjustment of the media of 123 MB and 230 MB, even if there is an adjustment error, since the actual reading and writing operations are not influenced, the adjustment error can be ignored. In the light emission fine adjustment for performing the PWM recording of the medium of 540 MB or the medium of 640 MB, the adjustment error caused by the fluctuation of the return light from the ID field exerts a large influence on the reading and the writing operations and is one of the causes which deteriorate an error rate. By avoiding the light emission adjustment in the ID field which is the cause of the adjustment error and by adjusting the light emission only in the data field, the occurrence of the adjustment error can be prevented.

At a time point when the updating of ID information is detected, the light emission timing control unit recognizes that the ID field is finished and the present position exists at the head of the data field, thereby allowing the light emission adjustment of the laser diode to be executed. At a time point when a specified time has elapsed after a sector mark SM included in the ID field is detected, the light emission timing control unit recognizes that the ID field is finished and the present position exists at the head of the data field, thereby allowing the light emission adjustment of the laser diode to be executed. Further, at a time point when a specified time has elapsed after an address mark included in the ID field is detected, the light emission timing control unit recognizes that the ID field is finished and the present position exists at the head of the data field, thereby allowing the light emission adjustment of the laser diode to be executed. Further, at a time point when an output obtained by comparing the read signal of the ID field with a predetermined slice level does not fluctuate, the light emission timing control unit can also recognize that the ID field is finished and the present position exists at the head of the data field, thereby allowing the light emission adjustment of the laser diode to be executed.

The light emission timing control unit intermittently drives the laser diode so as to emit light in accordance with the timing determined on the basis of a physical length of the data fields which is determined by the kind of medium and a rotational speed of the medium by a spindle motor. The power is measured by the monitor power measuring unit every light emitting period. When the end of the ID field cannot be recognized, the light emission timing control unit inhibits the light emission adjustment of the laser diode. As items for discriminating the end of the ID field, the light emission timing control unit has a feature for updating the time points of the ID information, a time point when a predetermined time has elapsed after the sector mark was detected, a time point when a predetermined time has elapsed from the detection of the address mark, and a time point when the signal obtained by comparing the ID signal with the predetermined slice level does not fluctuate. Either one of the plurality of discrimination items is selected and the end of the ID field is discriminated. When the end of the ID field cannot be determined by the selected discrimination item, the end of the ID field can be also determined by changing the discrimination item to another item. As timings for performing the light emission fine adjustment of the laser diode only in the data fields while avoiding the ID fields by the light emission fine adjustment processing unit and the light emission timing control unit, they are set to a timing of the initial operation just after the insertion of the medium cartridge, a timing of the retrying operation, and a timing of a predetermined time interval in case of a state where no command is issued from the upper apparatus. Further, according to another embodiment of the invention, in addition to the light emission fine adjustment processing unit and the automatic power control holding unit, the light emission timing control unit and the test zone confirming unit can be also provided.

The above and other objects, features, and advantages of the present invention will become more apparent from the following detailed description with reference to the drawings.

BRIEF DESCRIPTION OF THE DRAWINGS

FIGS. 1A and 1B are block diagrams of an optical disk drive according to the invention;

FIG. 2 is an explanatory diagram of an internal structure of an apparatus in which an MO cartridge has been loaded;

FIG. 5 is a block diagram of a laser diode control circuit in FIGS. 1A and 1B;

FIGS. 6A to 6J are time charts of signals, light emitting currents, subtraction currents, and monitor currents by the PWM recording of the invention with respect to a medium of a direct overwrite corresponding type as an example;

FIGS. 7A to 7J are time charts of signals, light emitting currents, subtraction currents, and monitor currents by the PPM recording of the invention with respect to a medium of the direct overwrite corresponding type as an example;

FIG. 13 is an explanatory diagram of power table registration contents by a light emission coarse adjustment processing unit in FIG. 5;

FIG. 14 is an explanatory diagram of a zone name, a radial position, and a track No. of a medium;

FIG. 15 is a detecting characteristics diagram of a carriage position sensor in FIG. 3 which is used for detection of a test zone;

FIGS. 16A to 16G are time charts of the light emission fine adjustment according to the invention;

FIGS. 17A and 17B are flowcharts for an initializing process in association with a medium insertion in which the light emission fine adjustment of the invention is performed;

FIG. 22 is a flowchart for a first writing power fine adjustment according to the invention;

FIGS. 28A to 28G are time charts of detection information of an ID field which is detected by the read LSI circuit in FIG. 27;

DETAILED DESCRIPTION OF THE PREFERRED EMBODIMENT

[Apparatus Construction]

Figure 1B:
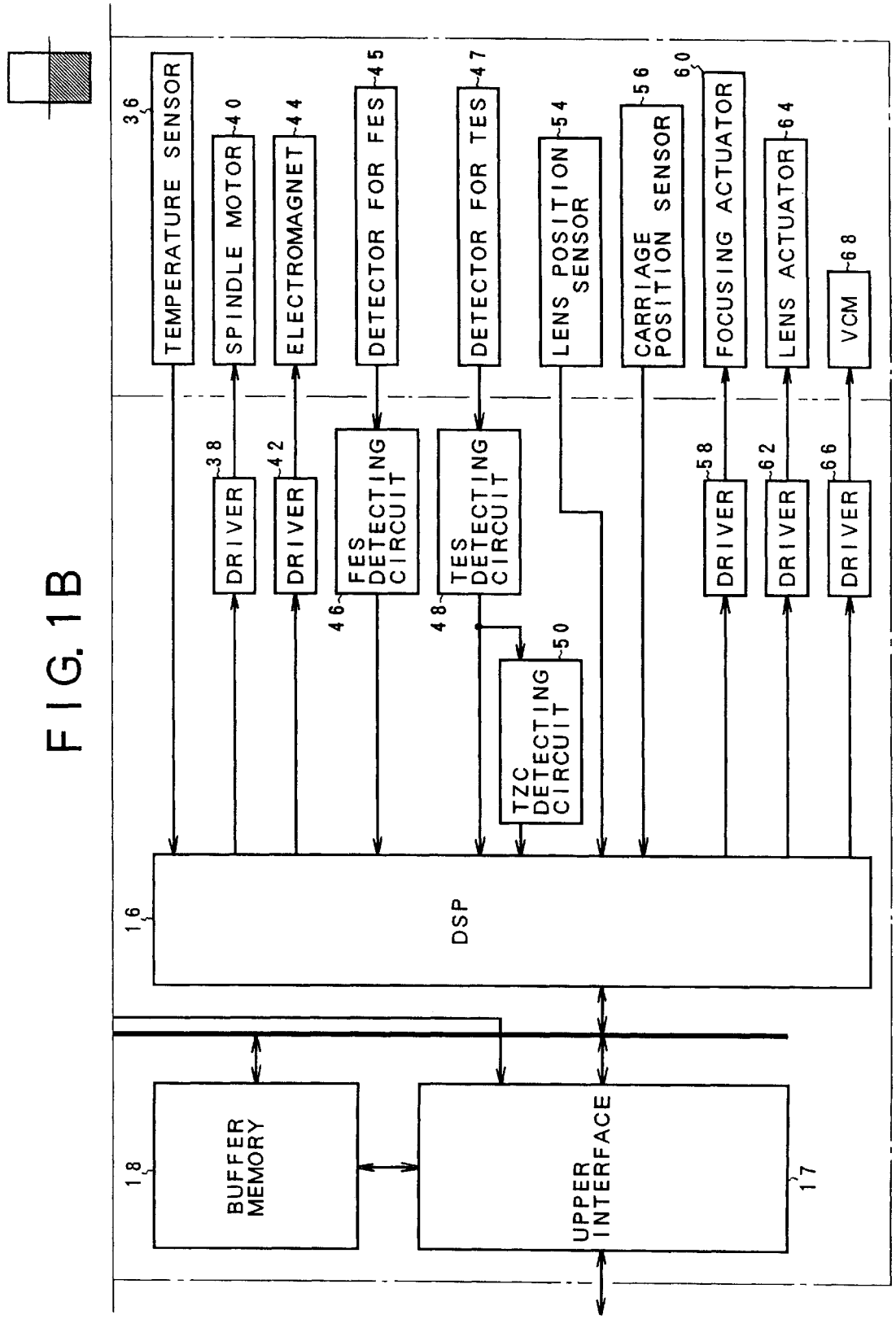

FIGS. 1A and 1B are circuit block diagrams of an optical disk drive of an optical storage apparatus of the invention. The optical disk drive of the invention comprises a control unit 10 and an enclosure 11. The control unit 10 has: an MPU 12 for performing a whole control of the optical disk drive; an interface 17 for transmitting and receiving commands and data to/from an upper (host) apparatus; an optical disk controller (ODC) 14 for executing processes necessary for writing/reading data to/from an optical disk medium; a DSP 16, and a buffer memory 18. The optical disk controller 14 includes a formatter 14-1 for forming a recording format of a medium by a writing access and an ECC unit 14-2 for forming an ECC from write data and for detecting and correcting errors with respect to read data. The buffer memory 18 is commonly used by the MPU 12, optical disk controller 14, and upper interface 17. A write LSI circuit 20 is provided for the optical disk controller 14. An encoder 21 and a laser diode control circuit 22 are provided in the write LSI circuit 20. A control output of the laser diode control circuit 22 is supplied to a laser diode unit 30 provided in an optical unit on the enclosure 11 side. The laser diode unit 30 integratedly has a laser diode 100 and a detector 102 for monitoring. The encoder 21 converts write data into data having a format of the PPM recording or the PWM recording. In the embodiment, as an optical disk to be recorded or reproduced by using the laser diode unit 30, namely, as a rewritable MO cartridge medium, any one of the MO cartridge media of 128 MB, 230 MB, 540 MB, and 640 MB which need the erasing operation and, further, a cartridge medium of a direct overwrite corresponding type which does not need the erasing operation can be used. Among them, with respect to the MO cartridge media of 128 MB and 230 MB, a pit position recording (PPM recording) in which data is recorded in correspondence to the presence or absence of a mark on the medium is used. A ZCAV is used as a recording format of the medium. A recording area is set to one zone in case of the medium of 128 MB and it is set to 10 zones in case of the medium of 230 MB. With respect to the MO cartridge media of 540 MB and 640 MB of a high density recording, a pulse width recording (PWM recording) in which edges of a mark, namely, a front edge and a rear edge are made to correspond to data is used. The PWM recording is also called a mark recording or an edge recording. In this instance, a difference between the storage capacities of 640 MB and 540 MB depends on a difference between the sector capacities. When the sector capacity is equal to 2048 bytes, the storage capacity is equal to 640 MB. On the other hand, when the sector capacity is equal to 512 bytes, the storage capacity is equal to 540 MB. The recording format of the medium is based on the zone CAV system. A recording area is set to 11 zones in case of the medium of 640 MB and is set to 18 zones in case of the medium of 540 MB. As mentioned above, the optical disk drive of the invention can correspond to the MO cartridge medium of the storage capacity of 128 MB, 230 MB, 540 MB, or 640 MB. Therefore, when the MO cartridge is loaded into the optical disk drive, an ID field of the medium is first read, the kind of medium is recognized by the MPU 12 from a pit interval, and the kind obtained as a recognition result is notified to the formatter 14-1 of the optical disk drive 14. Consequently, in case of the medium of 128 MB or 230 MB, a formatting process corresponding to the PPM recording is executed. In case of the medium of 540 MB or 640 MB, a formatting process according to the PWM recording is performed and an ECC code is formed from the write data by the ECC processing unit and is added. Data is converted into PPM recording data or PWM recording data by the encoder 21 of the write LSI circuit 20 and the resultant data is written onto the medium by a light emission driving by the laser diode control circuit 22.

As a reading system for the optical disk drive 14, a read LSI circuit 24 is provided. A read demodulating circuit 25 and a decoder 26 are built into the read LSI circuit 24. A photosensing signal of the return light of the beam from the laser diode unit 30 by a detector 32 for ID/MO provided for the enclosure 11 is input as an ID signal and an MO signal to the read LSI circuit 24 via a head amplifier 34. The circuit functions of an AGC circuit, a filter, a sector mark detecting circuit, a synthesizer, a PLL, and the like are provided in the read demodulating circuit 25 of the read LSI circuit 24. A read clock and read data are formed from the input ID signal and MO signal and are output to the decoder 26, thereby demodulating the PPM data or PWM data to the original NRZ data. Since a constant angular velocity control (CAV control) is used as a control of a spindle motor 40, a switching control of a clock frequency corresponding to the zone is executed by the MPU 12 to the synthesizer built in the read LSI circuit 24. A detection signal of a temperature sensor 36 provided on the enclosure 11 side is supplied to the MPU 12 via the DSP 16. The MPU 12 controls each of the reading, writing, and erasing light emitting powers in the laser diode control circuit 22 to an optimum value on the basis of an environment temperature in the apparatus detected by the temperature sensor 36. The MPU 12 controls the spindle motor 40 provided on the enclosure 11 side by a driver 38 via the DSP 16. Since the recording format of the MO cartridge is based on the zone CAV, the spindle motor 40 is rotated at a predetermined velocity of, for example, 3600 rpm. The MPU 12 also controls an electromagnet 44 provided on the enclosure 11 side by a driver 42 via the DSP 16. The electromagnet 44 is arranged on the side opposite the beam irradiating side of the MO cartridge loaded in the apparatus and supplies an external magnetic field to the medium upon recording and erasing.

The DSP 16 realizes a servo function for positioning the beam from the laser diode 30 on the medium. For this purpose, a detector 45 for FES for receiving the beam return light from the medium is provided for the optical unit on the enclosure 11 side. An FES detecting circuit (focusing error signal detecting circuit) 46 forms a focusing error signal E1 from a photosensing output of the detector 45 for FES and supplies it to the DSP 16. A detector 47 for TES for receiving the beam return light from the medium is also provided for the optical unit on the enclosure 11 side. A TES detecting circuit (tracking error signal detecting circuit) 48 forms a tracking error signal E2 from a photosensing output of the detector 47 for TES and supplies the signal E2 to the DSP 16. The tracking error signal E2 is input to a TZC detecting circuit (track zero-cross point detecting circuit) 50, so that a track zero-cross pulse E3 is formed and input to the DSP 16. A lens position sensor 54 for detecting a lens position of an objective lens for irradiating the laser beam onto the medium is provided on the enclosure 11 side. A lens position detection signal (LPOS) E4 of the sensor 54 is input to the DSP 16. A carriage position sensor 56 for detecting the absolute position of a carriage for moving a movable optical system on which the objective lens is mounted in the radial direction of the medium is also provided on the enclosure 11 side and inputs a carriage position detection signal E5 of the sensor 56 to the DSP 16. A PSD (position sensing device) in which a light emitting device is mounted and a line-shaped photosensing unit is fixed onto the carriage side and which generates a subtraction current corresponding to a photosensing position of the spot light as a position detection signal is used as a carriage position sensor 56. Further, the DSP 16 controls a focusing actuator 60, a lens actuator 64, and a VCM 68 through drivers 58, 62, and 66 in order to control the position of the beam spot on the medium.

The enclosure 11 in the optical disk drive is shown in FIG. 2. The spindle motor 40 is provided in a housing 67. A loading operation is performed in a manner such that by inserting an MO cartridge 70 from an inlet door 69 side to a hub of a rotational axis of the spindle motor 40, an MO medium 72 in the MO cartridge 70 is attached to the hub of the rotational axis of the spindle motor 40. A carriage 76 which is movable in the direction traversing the medium tracks by the VCM 68 is provided under the MO medium 72 in the loaded MO cartridge 70. A position of the carriage 76 can be detected as an absolute position by the carriage position sensor 56. An objective lens 80 is mounted on the carriage 76. A beam from the laser diode provided in a fixed optical system 78 enters the lens through a prism 82, thereby forming a beam spot on the medium surface of the MO medium 72. The objective lens 80 is moved in the optical axial direction by the focusing actuator 60 shown in the enclosure 11 in FIGS. 1A and 1B and can be moved within a range of, for example, tens of tracks in the radial direction traversing the medium tracks by the lens actuator 64. A position of the objective lens 80 mounted on the carriage 76 is detected by the lens position sensor 54 shown in FIGS. 1A and 1B. The lens position sensor 54 sets the lens position detection signal to 0 at a neutral position where the optical axis of the objective lens 80 is directed right overhead and generates the lens position detection signal E4 corresponding to the movement amounts of the different polarities for the movement to the outer side and the movement to the inner side, respectively.

Figure 3:
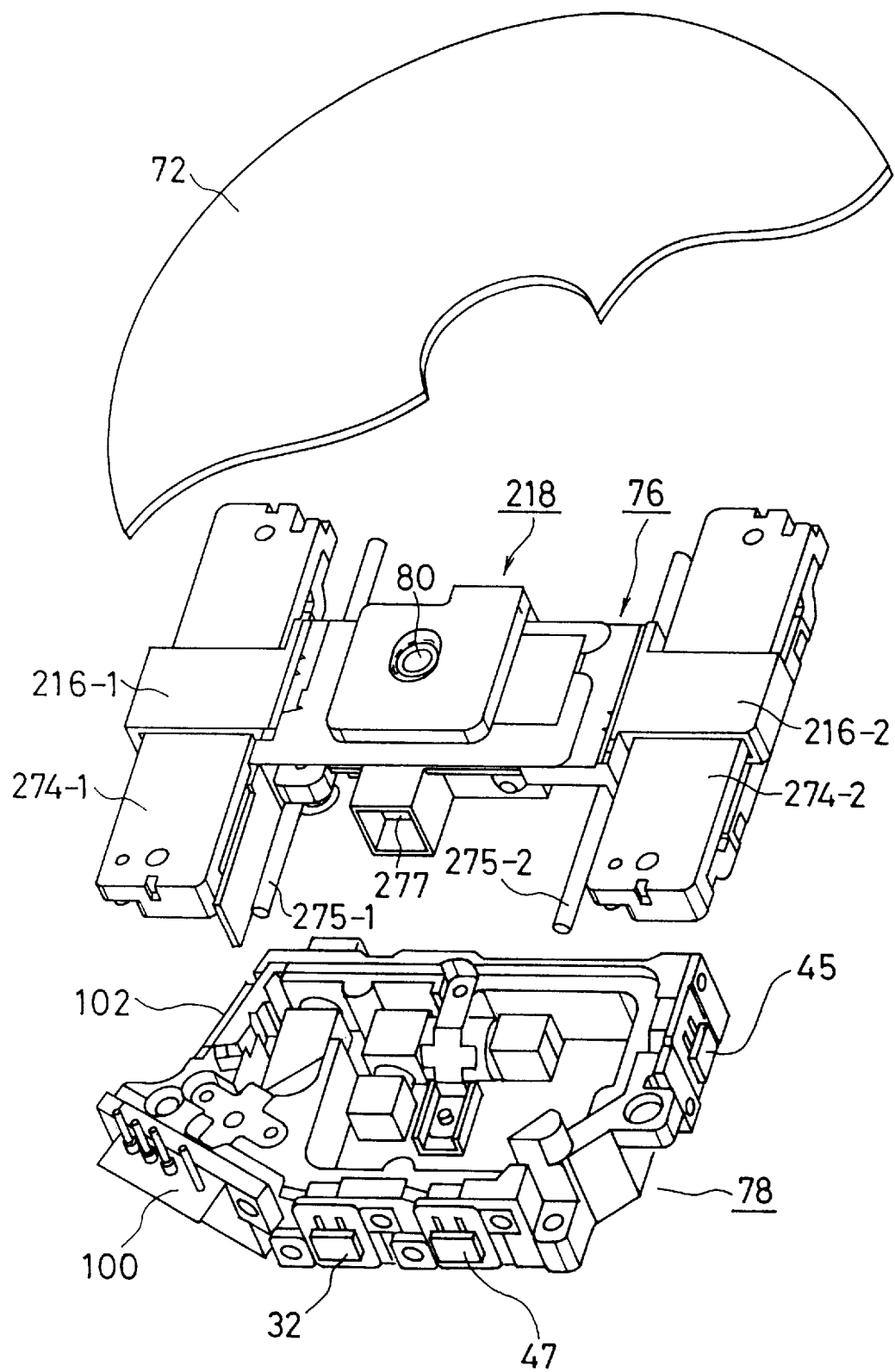
FIG. 3 is an explanatory diagram of the structures of a carriage and a head optical system in FIG. 2.

FIG. 3 shows specific examples of the carriage and the head optical system in FIG. 2. The fixed optical system 78 is fixed to a frame (not shown) of the apparatus. The carriage 76 which is movable along guide rails 275-1 and 275-2 is provided in front of the fixed optical system 78. Box-shaped carriage driving coils 216-1 and 216-2 which are opened in the front and rear portions are provided on the both sides of the carriage 76. The carriage driving coils 216-1 and 216-2 are inserted into a pair of magnetic units 274-1 and 274-2 fixed to the apparatus frame. A voice coil motor is constructed by the carriage driving coils 216-1 and 216-2 and magnet units 274-1 and 274-2. An optical head movable unit 218 having the objective lens 80 is mounted on the carriage 76. The optical head movable unit 218 has a beam incident/emitting port 277, thereby allowing the light beam to enter or be emitted to/from the fixed optical system 78. The optical head movable unit 218 mounted on the carriage 76 moves the objective lens 80, thereby moving the beam spot in the radial direction on the medium surface under the optical disk 72 with a part cut away. The laser diode 100, detector 102 for monitoring, detector 32 for ID/MO, detector 45 for FES, and detector 47 for TES are attached to the fixed optical system 78.

Figure 4:
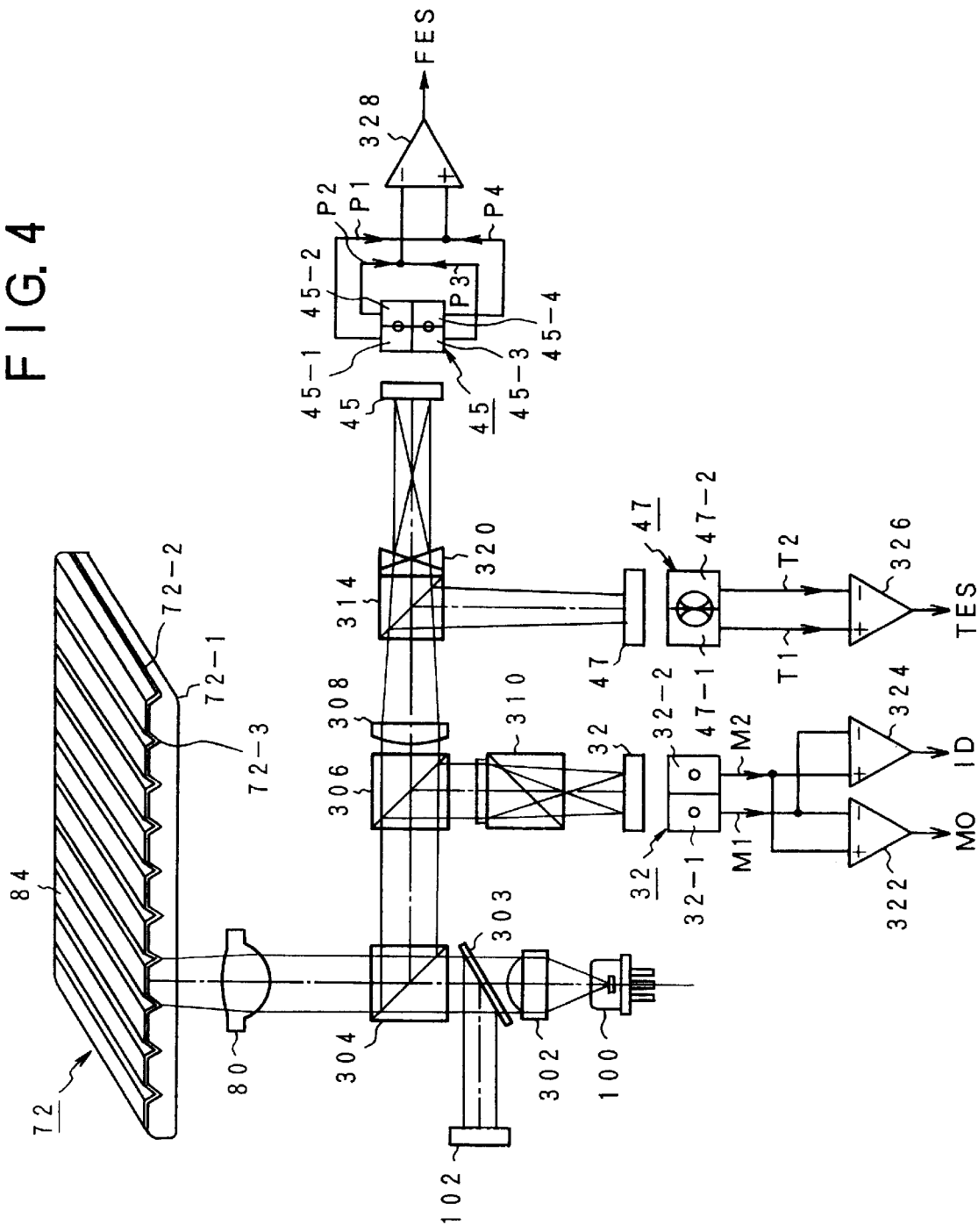
FIG. 4 is an explanatory diagram of the head optical system in FIG. 3.

FIG. 4 shows the details of the fixed optical system 78 in FIG. 3. Two optical systems of going and returning paths exist in the optical system. First, the going path optical system will be described. The diffused laser beam which is emitted from the laser diode 100 is converted into parallel light by a collimator lens 302. The parallel light, after it passes through the collimator lens 302, transmits through a beam splitter 304 and enters the objective lens 80. The beam light which enters the objective lens 80 is converged, thereby forming a beam spot on the disk medium 72. In the disk medium 72, an MO layer 72-2 is provided on a board 72-1 and magnetization reversed pits 84 are formed by grooves 72-3 in the circumferential direction. Subsequently, the returning path optical system will be explained. The beam light reflected from the disk medium 72 reversely passes along the same path of the objective lens 80 and beam splitter 304 as the going path and is reflected by the beam splitter 304 and enters a beam splitter 306. The beam splitter 306 divides the incident beam light into a transmission light which is sent to a detecting lens 308 and to a reflection light which is sent to a Wollaston unit 310. The reflection light is further divided in accordance with polarization components and enters the detector (2-split detector) 32 for ID/MO. The detector 32 for ID/MO has photosensing units 32-1 and 32-2. Photosensing signals M1 and M2 of the photosensing units 32-1 and 32-2 are input to operational amplifiers 322 and 324, thereby generating an MO signal and an ID signal. That is, MO=ID=M2−M1. The light transmitted from the beam splitter 306 to the detecting lens 308 is divided by a Foucault unit 314 and enters the detector (2-split detector) 47 for TES and detector (4-split detector) 42 for FES. The detector 47 for TES has photosensing units 47-1 and 47-2 and generates photosensing signals T1 and T2. The photosensing signals T1 and T2 of the photosensing unit 47-1 and 47-2 are input to an operational amplifier 326 and a TES signal of (TES=T1−T2) is generated. The transmission light is further divided by a cross prism 320 in the Foucault unit 314 and enters the detector 45 for FES. The detector 45 for FES has fours-split photosensing units 45-1, 45-2, 45-3, and 45-4 and generates photosensing signals P1 to P4. The photosensing signals P1 to P4 of the photosensing units 45-1 to 45-4 are added and input to an operational amplifier 328 and an FES signal is generated. That is, $$FES=(P1+P3)-(P2+P4)$$

A half mirror 303 is arranged between the collimator lens 302 and beam splitter 304. The half mirror 303 separates a part of the laser beam and allows the separated beam to enter the detector 102 for monitoring.

[Light Emitting Adjustment]

FIG. 5 is a circuit block diagram of the laser diode control circuit 22 provided in the write LSI circuit 20 of the control unit 10 in FIGS. 1A and 1B and shows an example of an ordinary MO cartridge medium in which the erasing operation is necessary. As for the cartridge medium of the direct overwrite corresponding type in which the erasing operation is unnecessary, an assisting power for raising the writing power at a high speed is set instead of the erasing power. The laser diode 100 and detector 102 for monitoring using a photodiode are integratedly provided in the laser diode unit 30. The laser diode 100 receives a driving current I by a power voltage Vcc, emits light, forms a laser beam by the optical unit, and irradiates the beam onto the medium surface, thereby recording and reproducing. A part of the light from the laser diode 100 enters the detector 102 for monitoring. The detector 102 generates a photosensing current i0 which is proportional to the light emitting power of the laser diode 100. A reading power current source 104, an erasing power current source 106, a first writing power current source 108, and a second writing power current source 110 are connected to the laser diode 100 in parallel with respect to each other and supply a reading current I0, an erasing power current I1, a first writing power current I2, and a third writing power current I3, respectively. That is, the reading power current I0 flows at the time of the light emission by the reading power, a current (I0+I1) obtained by adding the erasing power current I1 to the reading power current I0 flows at the time of the light emission by the erasing power, and a current (I0+I1+I2) obtained by further adding the first writing power current I2 to the current (I0+I1) flows at the time of the light emission by the first writing power. At the time of the light emission by the second writing power, a current (I0+I1+I3) obtained by adding the second writing power current I3 to the reading power current I0 and erasing power current I1 flows. An automatic power control unit (hereinbelow, referred to as an "APC") 138 is provided for the reading power current source 104. A specified target reading power as a target power is set to the APC 138 through a target DAC register 120 and a D/A converter (hereinbelow, referred to as a "DAC") 136. The APC 138 can be switched to a holding state by an external signal. When the APC 138 is switched to the holding state, an output, upon switching to the holding state, is maintained and a feedback control based on the difference between the target reading power and a measuring power is stopped. An EP current DAC register 122 and a DAC 140 are provided as an EP current instructing unit for the erasing power current source 106. A WP1 current DAC register 124 and a DAC 142 are provided as a WP1 current instructing unit for the WP1 current source 108. Further, a WP2 current DAC register 126 and a DAC 144 are provided as a WP2 current instructing unit for the second writing power current source 110. Consequently, a current of each of the current sources 104, 106, 108, and 110 can be properly changed by setting a DAC instruction value for each of the corresponding registers 120, 122, 124, and 126. In this instance, a light emission current source circuit is constructed by the registers, DACs, and constant current sources. As for the control by the APC 138, a feedback control is performed so that a monitor current im obtained from a photosensing current i0 of the detector 102 coincides with a target voltage of the DAC 136 corresponding to the target reading power. For this purpose, in order to feedback the monitor current im corresponding to the reading power to the APC after subtracting the photosensing currents at the time when the light emission is performed by the erasing power, the first writing power, and the second writing power exceeding the reading power, subtraction current sources 112, 114, and 116 are provided for the detector 102 for monitoring. An arbitrary subtraction current i1 can be set to the subtraction current source 112 for the erasing power by an EP subtraction DAC register 128 and a DAC 146 as an EP subtraction current instructing unit. An arbitrary subtraction current i2 can be set to the subtraction current source 114 for the first writing power by a WP1 subtraction DAC register 130 and a DAC 148 as a WP1 subtraction current instruction unit. An arbitrary subtraction current i3 can be, further, set to the subtraction current source 116 for the second writing power by a WP2 subtraction DAC register 132 and a DAC 150 as a WP2 substraction current instructing unit. The monitor current im in the light emitting modes of the three subtraction current sources i1, i2, and i3 are as follows.

I. At the time of the light emission by the reading power: im=i0

II. At the time of the light emission by the erasing power: im=i0−i1

III. At the time of the light emission by the first writing power: im=i0−(i1+i2)

IV. At the time of the light emission by the second writing power: im=i0−(i1+i3)

Therefore, even at the time of the light emission by any one of the erasing power and the first and second writing powers exceeding the target reading power, by subtracting the corresponding subtraction current from the photosensing current i0, the monitor current im flows to a monitor voltage detecting register 118 as a current corresponding to the reading power and is fed back to the APC 138. Consequently, irrespective of any one of the light emitting powers, the APC 138 controls the reading power current source 104 so as to always maintain the target reading power, thereby realizing the automatic power control of the specified erasing power, first writing power, and second writing power. With respect to the subtraction current as well, a subtraction current source circuit is constructed by the registers, DACs, and constant current sources.

FIG. 5 shows the ordinary MO cartridge medium in which the erasing operation is necessary as a target. However, in the case of the cartridge medium of the direct overwrite corresponding type in which the erasing operation is unnecessary, the registers 122 and 128, DACs 140 and 146, and current sources 106 and 112 for the erasing power EP can be used for the assisting power AP. It is also possible to provide registers, DACs, and current sources only for the assisting power AP. In the case of the cartridge medium of the direct overwrite corresponding type, at the time of the light emission by the reading power, the reading power current I0 flows. At the time of the light emission by the assisting power, the current (I0+I1) obtained by adding the assisting power current I1 to the reading power current I0 flows. At the time of the light emission by the first writing power, further, the current (I0+I1+I2) obtained by further adding the first writing power current I2 to the reading power current I0 and assisting power current I1 flows. At the time of the light emission by the second writing power, further, the current (I0+I1+I3) obtained by adding the second writing power current I3 to the reading power I0 and erasing power current I1 flows. A monitor voltage corresponding to the monitor current im by the monitor voltage detecting register 118 is converted to digital data by an A/D converter (hereinbelow, referred to as an "ADC") 152. The digital data is input to a monitor ADC register 134 and is subsequently read out by the MPU 12 side. Therefore, a measuring unit for the monitor current im is constructed by the ADC 152 and monitor ADC register 134.

FIGS. 6A to 6J are time charts of signals, light emitting currents, subtraction currents, and monitor current of the PWM recording of the media of 540 MB and 640 MB of the direct overwrite corresponding type by the laser diode control circuit in FIG. 3. When it is assumed that write data of FIG. 6B is supplied synchronously with a write gate of FIG. 6A, the write data is converted to pulse width data of FIG. 6D synchronously with a write clock of FIG. 6C. On the basis of the pulse width data, an assist pulse for enabling the writing power to be raised at a high speed as shown in FIG. 6E is formed. Further, a first write pulse is formed as shown in FIG. 6F. Further, a second write pulse of FIG. 6G is formed. The second write pulse has the number of pulses corresponding to a pulse width of the pulse width data of FIG. 6D. For example, the pulse width data at the head has a pulse width of four clocks, the next pulse width data has two clocks, and the next pulse width data has three clocks. In correspondence to the above pulse width data, as for the second write pulse of FIG. 6G, two pulses are generated with respect to the 4-clock width of the head data subsequent to the first write pulse of FIG. 6F, no pulse is generated with respect to the next 2-clock width, and one pulse is generated with respect to the third 3-clock width. Information indicative of the pulse width is recorded. FIG. 6H shows light emitting currents and powers based on the assist pulse, first write pulse and second write pulse of FIGS. 6E, 6F, and 6G. First, the reading current always flows, thereby executing the DC light emission by the reading power RP. Consequently, the light emitting current (I0+I1) flows synchronously with the assist pulse, thereby increasing the power by an amount of the assisting power AP. The light emitting current I2 is added at the timing of the first write pulse and the current (I0+I1+I2) flows, so that the power is increased by an amount of the first writing power WP1. Further, the light emitting current I3 is added at the timing of the second write pulse and the current (I0+I1+I3) flows, so that the power is increased by an amount of the second writing power WP2. The subtraction current shown in FIG. 6I flows in the subtraction current sources 112, 114, and 116 in FIG. 6 synchronously with the light emitting current of FIG. 6H. That is, the subtraction current i1 corresponding to the increased amount of the assisting power AP, the subtraction current (i1+i2) flows by adding the next subtraction current i2 corresponding to the increased amount of the first writing power WP1, and further, the subtraction current (i1+i3) flows by adding the subtraction current i3 corresponding to the increased amount of the second writing power WP2. Therefore, the monitor current im of FIG. 6J indicates a value obtained by subtracting the subtraction current of FIG. 6H from the photosensing current i0 corresponding to the light emitting current and the light emitting power of FIG. 6H. Even during the light emission, the power is always converted to a predetermined current corresponding to the reading power and is fed back to the APC 138.

FIGS. 7A to 7J are time charts of the signals, light emitting currents, subtraction currents, and monitor currents at the time of the PWM recording of the medium of 540 MB or 640 MB of the direct overwrite corresponding type. When it is assumed that write data of FIG. 7B is supplied synchronously with a write gate of FIG. 7A, a pit edge pulse of FIG. 7D is generated synchronously with a write clock of FIG. 7C. In correspondence to the pit edge pulse, an assist pulse of FIG. 7E and a first write pulse of FIG. 7F are formed. In the PPM recording, a second write pulse of FIG. 7G is not used. By supplying the light emitting current of FIG. 7H by the assist pulse and the first write pulse as mentioned above to the laser diode, a light emitting power P is obtained. In the PPM recording, for example, since the assisting power AP is the same as a reading power RP, the light emission by the reading power RP by the reading power current I0 is maintained even at the timing of the assist pulse. At the timing of the first write pulse, the light emitting current increases to (I1+I2), thereby obtaining the power in which the assisting power AP was added to the first writing power WP1. As a subtraction current of FIG. 7H, the subtraction current (i1+i2) is supplied at the light emitting timing of the first write pulse. Therefore, the monitor current im of FIG. 7J is always maintained at the current corresponding to the photosensing current of the reading power.

Figure 8A:
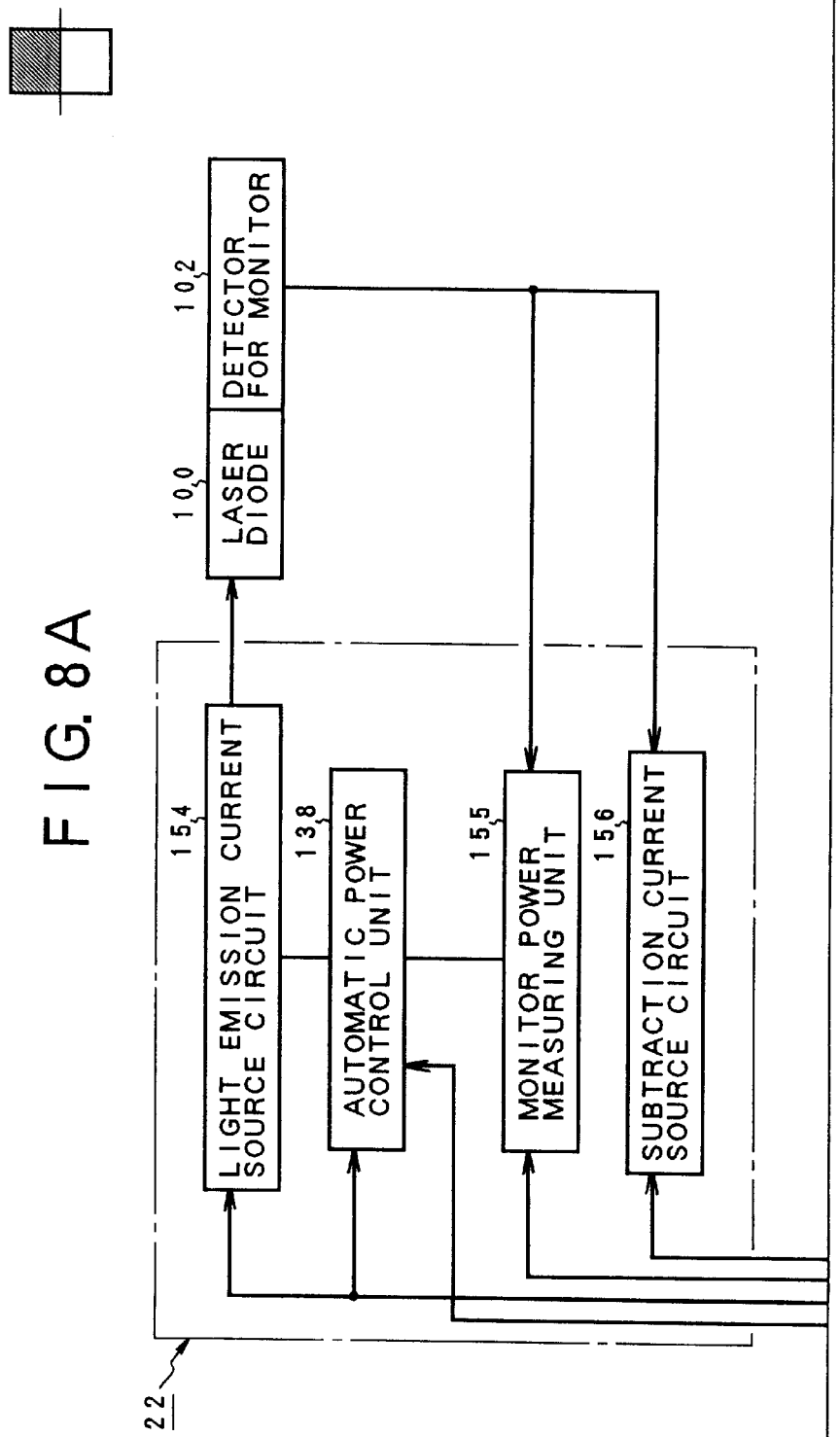
FIGS. 8A and 8B are functional block diagrams of a light emission fine adjusting process of the invention.
Figure 8B:
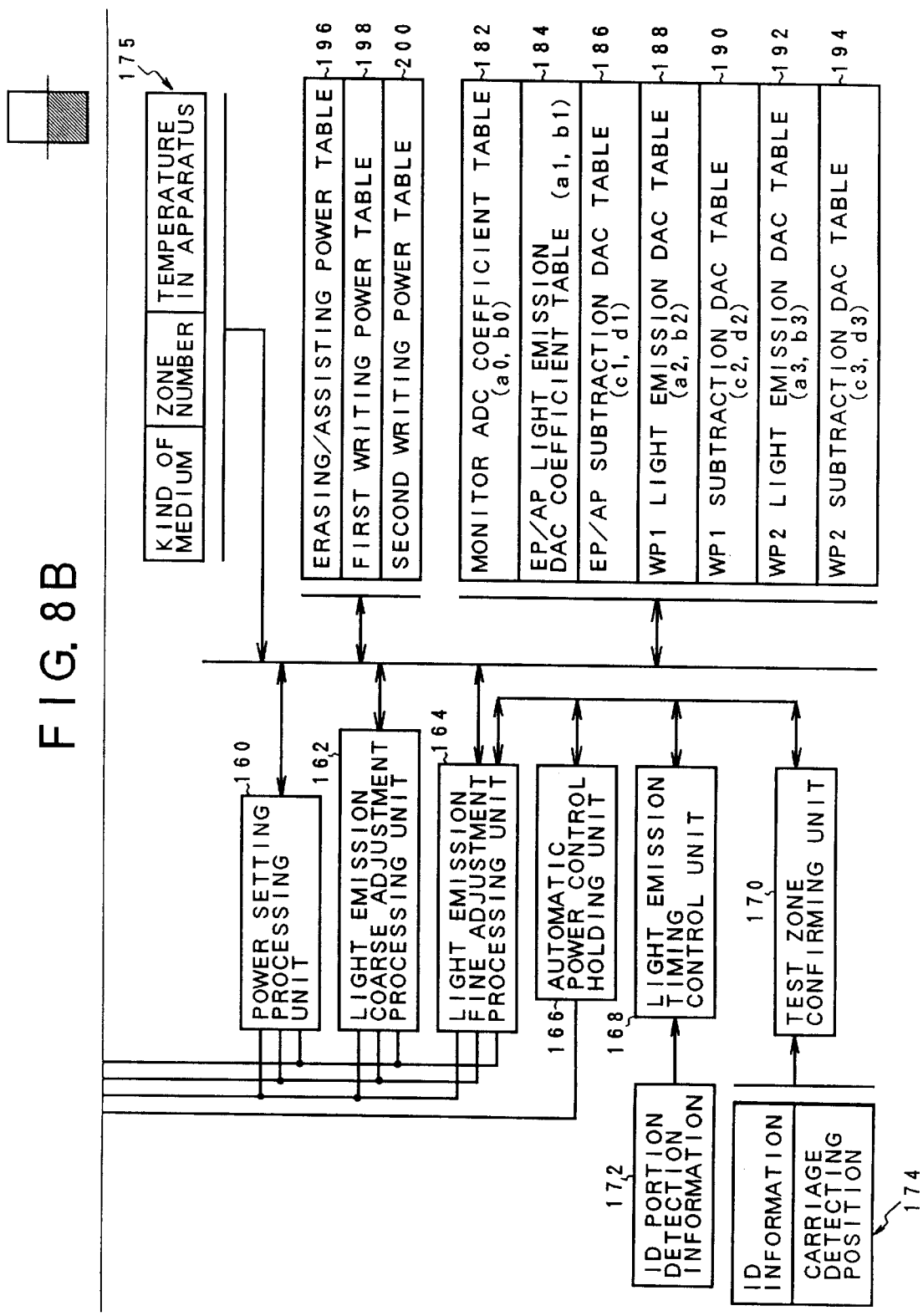

FIGS. 8A and 8B are functional block diagrams of the light emission control and the light emission adjustment of the laser diode which are realized by the MPU 12 in FIGS. 1A and 1B. A processing function of the light emission fine adjustment which is executed in the on-track state of the invention is also included. The laser diode control circuit 22 of the laser diode 100 is constructed by a light emission current source circuit 154, the automatic power control unit 138 (APC), a monitoring power measuring unit 155, and a subtraction current source circuit 156 and the details are shown in FIG. 5. In the reading/writing mode, powers are set in the laser diode control circuit 22 by a power setting processing unit 160. Optimum powers which are used in the power setting processing unit 160 have been stored in an erasing/assisting power table 196, a first writing power table 198, and a second writing power table 200. The erasing/assisting power table 196 can be also separately provided as a dedicated erasing power table and an assisting power table. According to the invention, a light emission coarse adjustment processing unit 162 and a light emission fine adjustment processing unit 164 are provided for the purpose of the light emission adjustment of the laser diode. The light emission coarse adjustment processing unit 162 executes the light emission adjustment in a state where both of the focusing servo and the tracking servo are turned off. On the other hand, the light emission fine adjustment processing unit 164 differs from the processing unit 162 with respect to a point that the processing unit 164 executes the light emission adjustment in an on-track control state of the beam spot for the medium in which both of the focusing servo and the tracking servo are turned on. As for the light emission fine adjustment processing unit 164 of the invention, an automatic power control holding unit 166, a light emission timing control unit 168, and a test zone confirming unit 170 are further provided. The kind of medium loaded, the zone number obtained from the access track, and further, the temperature in the apparatus by the temperature sensor 36 provided on the enclosure 11 side in FIGS. 1A and 1B are set into the light emission coarse adjustment processing unit 162, light emission fine adjustment processing unit 164 by a register 175 are used in the light emission adjustment and the power setting process at the time of the ordinary operation. As power table information, a monitor ADC coefficient table 182, an EP/AP light emission DAC coefficient table 184, an EP/AP subtraction DAC coefficient table 186, a WP1 light emission DAC coefficient table 188, a WP1 subtraction DAC coefficient table 190, a WP2 light emission DAC coefficient table 192, and a WP2 subtraction DAC coefficient table 194 are provided for the light emission coarse adjustment processing unit 162 and light emission fine adjustment processing unit 164. The EP/AP light emission DAC coefficient table 184 and EP/AP subtraction DAC coefficient table 186 can be also separately provided as an EP dedicated table and an AP dedicated table, respectively. A relational equation by the linear approximation of an ADC output as a measuring power value for an arbitrary power which gives an input monitor voltage in the ADC 152 for monitoring in FIG. 5 is obtained by the light emission adjusting process. An inclination a0 and a y axis cross point b0 of this relational equation are registered in the monitor ADC coefficient table 182. The relation of the register instruction value (light emission DAC value) for an arbitrary light emitting power in each of the DACs 140, 142, 144, 146, 148, and 150 in FIG. 5 is obtained by the linear approximation of the measurement result by the light emission adjustment. An inclination and a y axis cross point with respect to a relational equation about the relation obtained as mentioned above have been stored in each of the tables 184, 186, 188, 190, 192, and 194.

Figure 9:
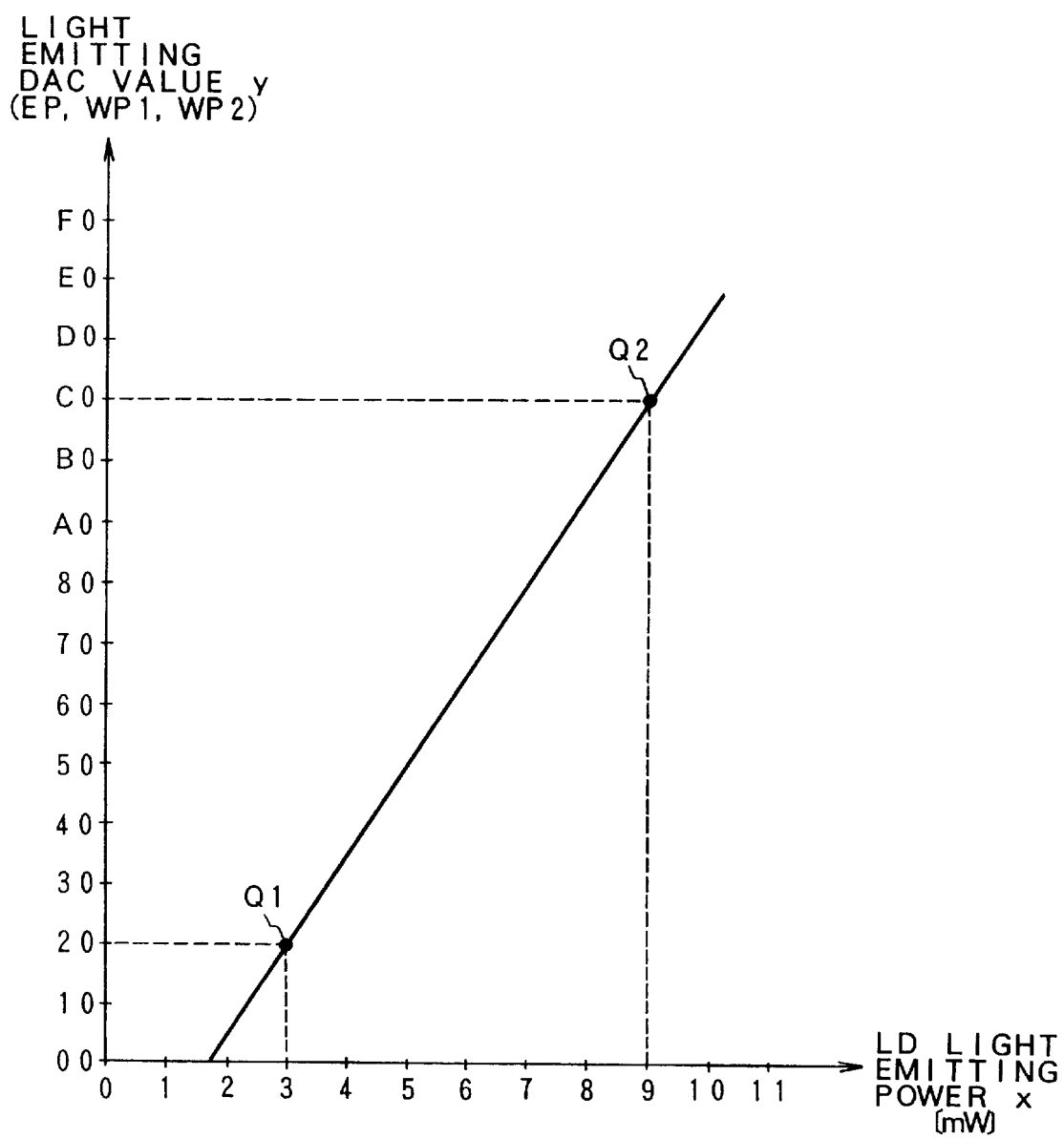
FIG. 9 is a characteristics diagram of a light emitting power and a DAC instruction value which are obtained by a light emission fine adjustment of the invention.

FIG. 9 shows the relation of a light emission DAC value y as a register instruction value for a light emitting power x [mW] of the laser diode 100. In the light emission adjustment, the light emission DAC value y is adjusted in a manner such that the light is emitted by the light emitting powers of 3 mW and 9 mW at two points of Q1 and Q2 and their measuring powers are accurately equal to 3 mW and 9 mW. An inclination (a) and a y axis cross point (b) are obtained from the equation $$y = a \cdot x + b$$

of a straight line passing through two points Q1 and Q2, after the completion of the adjustment is obtained and registered into a table. With respect to the coefficient tables 184, 188, and 192 of the light emitting current, since the relational equation of the linear approximation is set by $(y = a \cdot x + b)$, coefficients a1, a2, and a3 and y axis cross points b1, b2, and b3 are registered. On the other hand, with respect to the coefficient tables 186, 190, and 194 for the subtraction current, since the relational equation $(y = c \cdot x + d)$ of the linear approximation is defined, inclinations c1, c2, and c3 and the y axis cross points b1, b2, and b3 are registered.

Referring again to FIGS. 8A and 8B, in correspondence to all of the zones of the medium, peculiar power values have inherently been stored in the erasing/assisting power table 196 and the first writing power table 198 provided for the power setting processing unit 160 for setting the power by the reading and writing operations based on an upper command. In the invention, however, in the initial state where the medium is loaded, the tables do not have the powers of all of the zones and only the power values of at least two zones on the inner side and the outer side which are necessary for the light emission adjustment have been stored. Therefore, the light emission coarse adjustment processing unit 162 obtains a relational equation to linearly approximate each power for the zone number by the light emission adjustment using the power values of two zones which are initially set in the tables, calculates the powers corresponding to all of the zones from the relational equation, and registers them into the tables. Specifically speaking, by using the adjustment results of the ADC and DAC by the light emission coarse adjustment processing unit 162, the light emission fine adjustment processing unit 164 executes the measuring process by the light emission adjustment using the light emitting powers of the two zones which are initially set and the setting of each power for every zone according to the relational equation of the linear approximation based on the measurement results. Further, when a write command is received from the upper apparatus, by performing the test writing using each of the powers adjusted in the state after completion of the light emission adjustment, the optimum writing power of each zone corresponding to the temperature in the apparatus at that time is obtained and written to the medium.

Figure 10:
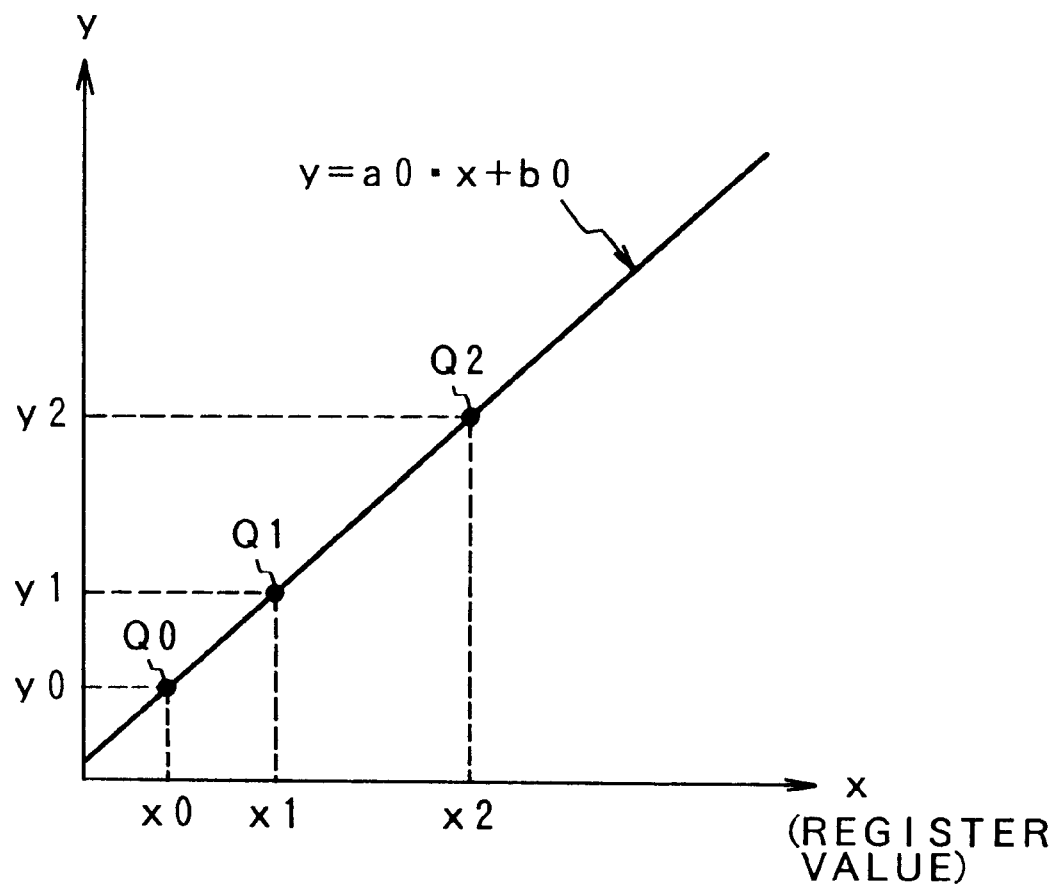
FIG. 10 is an explanatory diagram of a relational equation of a linear approximation by an adjustment of an ADC for monitoring in FIG. 5.

FIG. 10 shows a relational equation of the linear approximation obtained by a normalizing process of the monitor ADC 152 in FIG. 5 in the light emission coarse adjusting process. In the normalizing process of the monitor ADC 152, the specified reading power is set into the ADC instruction value y0 of the target DAC register 120, the light emission driving is performed, and the value x0 in the monitor ADC register 134 is read. Subsequently, the ADC instruction value (y1=2 mW) is set into the target DAC register 120, the light emission driving is performed, and the value x1 in the monitor ADC register 134 is read. Further, the instruction value (y2=4 mW) is set into the target DAC register 120, the light emission driving is performed, and the value x2 in the monitor ADC register 134 is read. By these processes, the measurement values of the ADC 152 for the powers at three points of the reading power, 2 mW, and 4 mW are obtained. Therefore, the inclination a0 and y axis cross point b0 are calculated as coefficients from the three relational equations and registered into the monitor ADC coefficient table 182 in FIGS. 8A and 8B. After the normalization is finished, accordingly, the measurement value x obtained from the monitor ADC register 134 is substituted into a relational equation (y=a0 x x+b0), thereby calculating the measuring power y. In this case, although precision of the relational equation is raised by obtaining three points Q0, Q1, and Q2, it is also possible to measure at two points.

Figure 11:
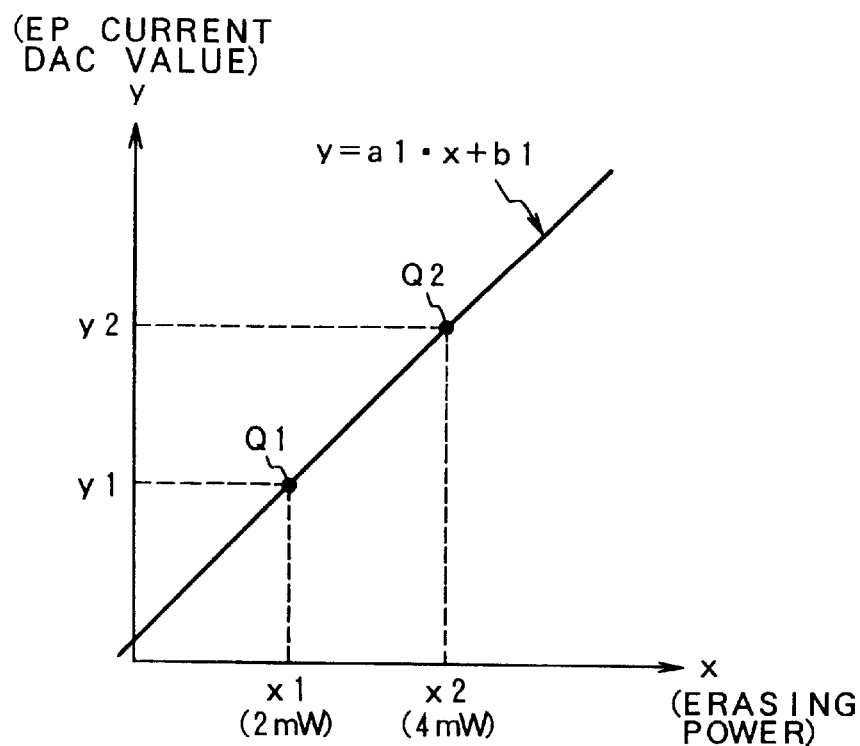
FIG. 11 is an explanatory diagram of a relational equation of the linear approximation in an erasing light emitting current in FIG. 5.
Figure 12:
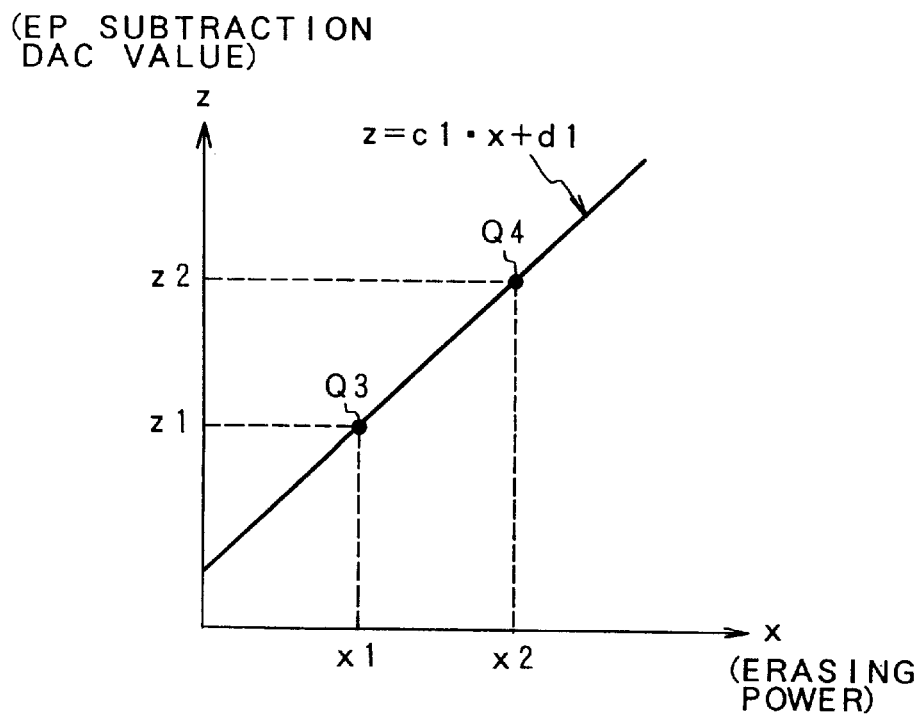
FIG. 12 is an explanatory diagram of a relational equation of the linear approximation in an erasing subtraction current in FIG. 5.

FIGS. 11 and 12 show relational equations of the linear approximation obtained by the light emission coarse adjustments of the DAC 140 which instructs the light emitting current for erasing and the DAC 146 which instructs the subtraction current for erasing in FIG. 5. First, while reading the monitor ADC 134, the register value y for the EP current DAC register 122 is increased so as to obtain the measuring power (x1=2 mW), thereby getting Q1(x1, y1) in FIG. 11. Subsequently, while reading the monitor ADC register 134, a register value z of the EP subtraction DAC register 128 is increased so that the measuring power functions as a reading power, thereby getting Q3(x1, z1) in FIG. 12. Subsequently, while reading the monitor ADC register 134, the register value y of the EP current DAC register 122 is increased so that the measuring power is equal to (x2=4 mW), thereby getting Q2(x2, y2) in FIG. 11. Further, while reading the monitor ADC register 134, the register value z of the EP subtraction DAC register 128 is increased so that the measuring power functions as a reading power, thereby getting Q4(x2, z2) in FIG. 12. After the completion of the power measurement by the light emission mentioned above, the two points Q1(x1, y1) and Q2(x2, y2) in FIG. 11 are substituted into a relational equation (y=a1·x+b1) of the linear approximation of the EP current DAC register value y for the power x, thereby calculating the inclination a1 and y axis cross point b1 from these two substitution equations, respectively. Subsequently, as shown in FIG. 12, Q3(x1, z1) and Q4(x2, z2) are substituted into a relational equation (z=c1·x+d1) while approximating a straight line connecting those two points, thereby calculating the inclination c1 and y axis cross point d1. The inclination a and y axis cross point b of the relational equation of the linear approximation of the register instruction value for an arbitrary power of the DAC 140 which instructs the erasing power light emitting current in FIG. 11 are registered in the EP/AP current DAC coefficient table 184 in FIGS. 8A and 8B. The inclination c and y axis cross point b of the relational equation of the linear approximation for obtaining the register value y for the DAC 146 for the subtraction current to the erasing power in FIG. 12 are registered in the EP/AP subtraction DAC coefficient table 186 in FIGS. 8A and 8B. As for an assisting power AP, since the DACs 140 and 146 for the EP are alternately used in FIG. 5, an adjustment result of the erasing power can be used as it is. In case of providing a circuit only for the AP, inclinations and y axis cross points of the linear approximations of an assist light emitting current and an assist subtraction current are obtained by the light emission fine adjustment similar to that for the erasing power, and are registered into the dedicated table. Such a light emission coarse adjustment is also similarly executed with respect to the first writing power WP1 and second writing power WP2. In the first writing power WP1, the adjustment is fundamentally the same as the light emission coarse adjustment for erasing except for a different point that two points of 4 mW and 8 mW are used for the instructing powers for the WP1 current DAC register 124. The inclination a2 and y axis cross point b2 of the relational equation of the linear approximation of the register value y for the arbitrary first writing power x are calculated. The inclination c2 and y axis cross point d2 of the relational equation of the linear approximation of the register value z of the subtraction current for the first writing power x are calculated. The values of a2 and b2 are registered into the WP1 current DAC coefficient table 188 and the values of c2 and d2 are registered into the WP1 subtraction DAC coefficient table 190 in FIGS. 8A and 8B, respectively. With respect to the second writing power, although substantially the same adjustment as the erasing light emission coarse adjustment is executed, the light emission adjustment is executed at two points of 4 mW and 8 mW in a manner similar to the first writing power and the subtraction current is subsequently adjusted so as to obtain the reading power. The inclination a3 and y axis cross point b3 of the relational equation of the linear approximation with regard to the DAC 144 which instructs the current of the second writing power light emission are calculated. The inclination c3 and y axis cross point d3 of the relational equation of the linear approximation with respect to the DAC 150 which instructs the subtraction current at the time of the light emission by the second writing power are calculated. The values of a3 and b3 are registered into the WP2 current DAC coefficient table 192 and the values of c3 and d3 are registered into the WP2 subtraction coefficient table 194 in FIGS. 8A and 8B, respectively.

FIG. 13 shows the registration contents of each of the coefficient tables 182 to 194 in FIGS. 8A and 8B which were registered by the foregoing light emission coarse adjustment. By forming relational equations of the linear approximation by using the values of the inclinations and the y axis cross points, the conversion from an arbitrary monitor voltage measurement value to the measuring power and the conversion from an arbitrary power to the current instruction value for the ADC can be realized.

[Light Emission Fine Adjustment]

A light emission fine adjusting process of the invention by the light emission fine adjustment processing unit 164 provided in FIGS. 8A and 8B will now be described. After completion of the coarse adjustment by the light emission coarse adjustment processing unit 162, the light emission fine adjustment processing unit 164 executes the light emission adjustment of the laser diode 100 in the on-track state of the beam spot to the medium in which both of the focusing servo and the tracking servo are turned on. The light emission fine adjustment is fundamentally the same as the light emission coarse adjustment. In case of the MO cartridge medium in which the erasing operation is necessary, with respect to each of the erasing power, the first writing power, and the second writing power, the light beam is sought to the test zone of the medium in a state where the on-track control is validated, the light emission by the testing powers at predetermined two points are sequentially instructed to the light emission current source circuit 154, and the laser diode 100 is light emission driven. At the same time, specified subtraction currents corresponding to the testing powers at two points are instructed to the subtraction current source circuit 156 and the register instruction value to the light emission current source circuit 154 is adjusted so that the measuring power of the monitoring power measuring unit 155 is equal to the target testing power. On the basis of the adjustment results of the testing powers at those two points, the relation with the register instruction value y of the light emission current source circuit 154 for the arbitrary light emitting power x is obtained by the linear approximation and the table information in which the inclination and the y axis cross point are registered is corrected. In the light emission fine adjustment of the cartridge medium of the direct overwrite corresponding type in which the erasing operation is unnecessary, with respect to each of the case of [(assisting power)+(first writing power)] and the case of [(assisting power)+(second writing power)], the light beam is sought to the test zone of the medium in a state where the on-track control is validated, the light emission by the testing powers at preset two points are sequentially instructed to the light emission current source circuit 154, and the laser diode 100 is light emission driven. At the same time, specified subtraction currents corresponding to the testing powers at two points are instructed to the subtraction current source circuit 156 and the register instruction value for the light emission current source circuit 154 is adjusted so that the measuring power of the monitoring power measuring unit 155 is equal to the target testing power. On the basis of the adjustment results by the testing powers at those two points, the relation between the arbitrary light emitting power x and the register instruction value y of the light emission current source circuit 154 is obtained by the linear approximation. The table information in which the inclination and the y axis cross point are registered is corrected. In addition to the light emission fine adjustment processing unit 164 as mentioned above, according to the invention, the automatic power control holding unit 166, light emission timing control unit 168, and test zone confirming unit 170 are provided. When the laser diode 100 is light emission driven by the light emission fine adjustment processing unit 164, the automatic power control holding unit 166 controls the automatic power control unit (APC)

138 into a holding state for a light emitting period of time. Therefore, the feedback control to make the measuring power coincide with the target reading power by the automatic power control unit 138 is not executed during the light emission of the laser diode 100 by the testing power. In the monitoring power measuring unit 155, the actual light emitting power based on the instructed power of the laser diode 100 is measured, thereby enabling the instruction value to the light emission current source circuit 154 to be accurately adjusted by the light emission fine adjustment processing unit 164. At the time of the adjustment by the test light emission of the laser diode by the light emission fine adjustment processing unit 164, the test zone confirming unit 170 discriminates whether the present position of the beam spot lies within a predetermined range of the test zone of the medium or not. When it is confirmed that the present position of the beam spot lies within the range of the test zone, the light emission adjustment is activated.

For example, in the case of the medium of 128 MB, a test zone of the medium has a construction as shown in FIG. 14. The medium is divided into the test zone, a control track zone, a data zone (user zone), and a control track zone from the inner side and radial positions and track numbers have been determined with respect to those zones. Among them, the test zone which is sought at the time of the light emission fine adjustment of the invention lies within a range of 23.53 to 23.75 mm at the medium radial position and the track number lies within a range of −292 to −17. As for the test zone, an innermost non-user zone can be fundamentally used in any one of the media of 230 MB, 540 MB, and 640 MB.

Referring again to FIGS. 8A and 8B, when the test zone is confirmed by the test zone confirming unit 170, ID information (stored in a register 174) by the reading of the track sector when seeking to the test zone or a carriage detecting position (stored in the register 174) of the carriage position sensor 56 provided to detect the absolute position of the carriage 76 as shown in FIG. 2 can be used. That is, since the track number is included in the ID information, by comparing the track number with the range of the track numbers of the test zone which have previously been allocated, whether the present position lies within the range of the test zone or not can be discriminated.

Detecting the characteristics of the carriage position sensor 56 in FIG. 2 for the medium position are as shown in FIG. 15. In the detecting the characteristics, a test zone detecting range 254 of the carriage position sensor 56 corresponding to a test zone 252 located on the inner side has been determined for a user zone 250 in the medium position shown on an axis of abscissa. Therefore, by comparing the detection value of the carriage position sensor 56 when the light beam is brought to the test zone with the test zone detecting range 254, whether the present position exists in the test zone or not can be discriminated. In the recognition of the present position by the ID information and the recognition of the present position by the carriage detecting position, in case of using the ID information, whether the present position exists in the test zone or not can be accurately discriminated by the ID information on a track unit basis. On the other hand, in the case of using the carriage detecting position, discriminating precision of the test zone is determined by the resolution of the carriage position sensor 56. Ordinarily, since the resolution of a detection distance of the PSD which is used as a carriage position sensor 56 is on the order of 100 microns, for example, it is possible to certainly detect whether the present position exists in a range of 23.53 to 23.75 mm of the radial position corresponding to the test zone in FIG. 14 or not. As a confirming process by the test zone confirming unit 170, it is also possible to construct in a manner such that both of the ID information and the carriage detecting position are used and, for instance, when the present position cannot be recognized from the ID information, the present position is recognized by the carriage detecting position. In contrast, it is also possible to construct in a manner such that the carriage detecting position is preferentially used and when the present position cannot be recognized from the carriage detecting position, the present position is recognized from the ID information.

The light emission timing control unit 168 in FIGS. 8A and 8B will now be described. In the case of adjusting the light emission of the laser diode 100 by the testing power by the light emission fine adjustment processing unit 164, the light emission timing control unit 168 allows the light emission adjustment of the laser diode by the testing power to be executed in only the data field (MO field) while avoiding the ID field of each sector with regard to each of the track sectors of the test zone in the on-track state.

FIGS. 16A to 16G are time charts for the processing operation of the light emission fine adjustment processing unit 164 of the invention and relate to the light emission fine adjustment of the erasing power as an example. That is, FIG. 16A shows sector information, FIG. 16B shows an ID detection signal, FIG. 16C shows a write gate signal, FIG. 16D shows an APC holding signal, FIG. 16E shows a subtraction DAC value for the erasing power, FIG. 16F shows a light emission DAC value for the erasing power, and further, FIG. 16G shows a monitoring ADC value, respectively. As will be obviously understood from the time charts, the sector information in FIG. 16A is constructed by ID fields and data fields. Information is recorded in the ID field by forming physical pits. With respect to the data field, since pits are formed by the magnetooptical recording, the medium surface is physically a mirror surface. Therefore, in case of light emission driving the laser diode 100 in the on-track state, the return light by the irradiation of the beam spot onto the medium track fluctuates by the concave and convex portions of the physical pits in the ID field. In the data field, however, since there are no physical concave and convex portions, a recording signal is stable at a predetermined level. As will be obviously understood from the explanatory diagram of the optical system of FIG. 4, the return light from the medium as mentioned above is reflected by a half mirror 303 and enters the detector 102 for monitoring. Thus, the measuring power (which is measured by the monitoring power measuring unit 155 in FIGS. 8A and 8B) of the laser diode 100 at the time of the light emission by the testing power fluctuates by the return light. In the invention, therefore, the laser diode 100 is light emission driven and the light emission adjustment is performed with respect to only the data field while avoiding the ID field of the sector information. An ID detection signal as shown in FIG. 16B is generated to enable the light emission driving in the data field of the sector information as mentioned above. The ID detection signal rises from the OFF state to the ON state at the end position of the ID field and is maintained in the ON state for a period of time during which the light emission adjustment can be performed in the data field and is subsequently turned off. The duration of the ON period of the ID detection completion signal has been predetermined on the basis of the physical length of the data field, the radial position of the medium, and the medium rotational speed produced by the spindle motor. The write gate signal of FIG. 16C is validated at the time the ID detection completion signal is turned on, thereby allowing the light emission driving by the testing powers of, for example, three times to be executed for the ON period of time. At the measuring timing of the monitoring power (monitor ADC value) of FIG. 16G in the ON/OFF period corresponding to the data field of the write gate signal, the measurement of the reading power for the first OFF period P1 and the measurement of the monitoring power by the testing power at each of points P2, P3, and P4 in the ON state of the subsequent write gate signal are executed. As shown in FIG. 16D, the write gate signal of FIG. 16C is output as an APC holding signal for the automatic power control unit 138. That is, the APC holding signal of the APC 138 is also turned on synchronously with the ON timing of the write gate signal. The APC 138 is switched to the holding state at the light emitting timing of the laser diode by the testing power. The feedback control to maintain the target reading power is cancelled, thereby enabling the measurement of the monitoring power by the testing power to be performed. A subtraction DAC value for the erasing power of FIG. 16E is maintained to a predetermined value for a period of time of the light emission adjustment of the erasing power. As for the light emission DAC value for the erasing power of FIG. 16F, an error between the monitor ADC value of FIG. 16G at that time and the target value at the reading power is obtained, for example, every sector. The light emission DAC value is corrected by the light emission adjustment of the data field of the next sector, thereby performing the light emission adjustment. In the cases of FIGS. 16A to 16G, the light emission DAC value for erasing is adjusted so that the monitor ADC value coincides with the target value by the light emission adjustment in the data field of three sectors.

The processing operation of the light emission fine adjustment processing unit 164 in FIGS. 8A and 8B will now be described with reference to flowcharts. FIGS. 17A and 17B are flowcharts for the medium inserting process in which the light emission fine adjusting process of the invention is executed. In the medium inserting process, in association with the insertion of the medium, first in step S1, the temperature in the apparatus is checked. In step S2, the rotation control of the spindle motor is started. In step S3, the VCM is coarsely adjusted by pressing the carriage to the outer side. In step S4, the laser diode 100 is turned on and the light emission coarse adjustment of the laser diode is executed by the light emission coarse adjustment processing unit 162 in FIGS. 8A and 8B. In step S5, a check is made to see if the medium is a full ROM. The discrimination about the full ROM can be made by checking the presence or absence of a write protection knob of the medium cartridge. That is, since the portion of the write protection knob of the full ROM is a space, by detecting this space portion, it is recognized that the medium cartridge is the full ROM. In case of the full ROM, the reading power is reduced for the rewritable medium. Since none of the writing power and the erasing power is used, there is no need to perform the adjustment. In step S6, the carriage is moved to a position near the center of the medium. The carriage movement is performed by supplying specified acceleration, constant speed, and deceleration currents in the coarse adjusting state of the VCM which was pressed to the outer side in step S3. The focusing servo is turned on in step S7. In step S8, an offset adjustment of the tracking error signal is performed. After that, in step S9, the focusing position is controlled so as to obtain the maximum amplitude of the tracking error signal, an offset in which the focusing position where the maximum amplitude is obtained is set to a focusing optimum line is detected, and this offset is set into the focusing servo. In step S10, an offset of the deviated tracking error signal is adjusted in a state where the offset detection of the focusing optimum line is finished. In step S11, the amplitude adjustment of the tracking error signal according to the kind of inserted medium is performed. After the completion of the amplitude adjustment of the tracking error signal, the offset adjustment of the tracking error signal is again performed in step S12. In step S13, a check is made to see if the rotation of the spindle motor has reached a specific rotational speed. The tracking servo is turned on in step S14, so that the on-track control state of the beam spot is obtained. In step S15, a slice level (echo slice level) for confirming the erasing light emission is set. In the setting of the slice level for confirming the erasing light emission, since the writing operation of the medium is executed at three stages of the erasing light emission, the writing light emission, and the reading light emission for verification and, when the erasing light emission is not performed, the normal data recording and writing cannot be performed by the next writing light emission, the slice level to confirm the erasing light emission is set to a value between the erasing power and the reading power. In step S16, the light beam is brought to the control track of the medium and the contents in the control track are read out. In step S17, the light emission fine adjustment of the laser diode driving current by the light emission fine adjustment processing unit 164 in FIGS. 8A and 8B is executed. Finally, in step S18, alternating information of the medium is read out and stored into the RAM.

Figure 18A:
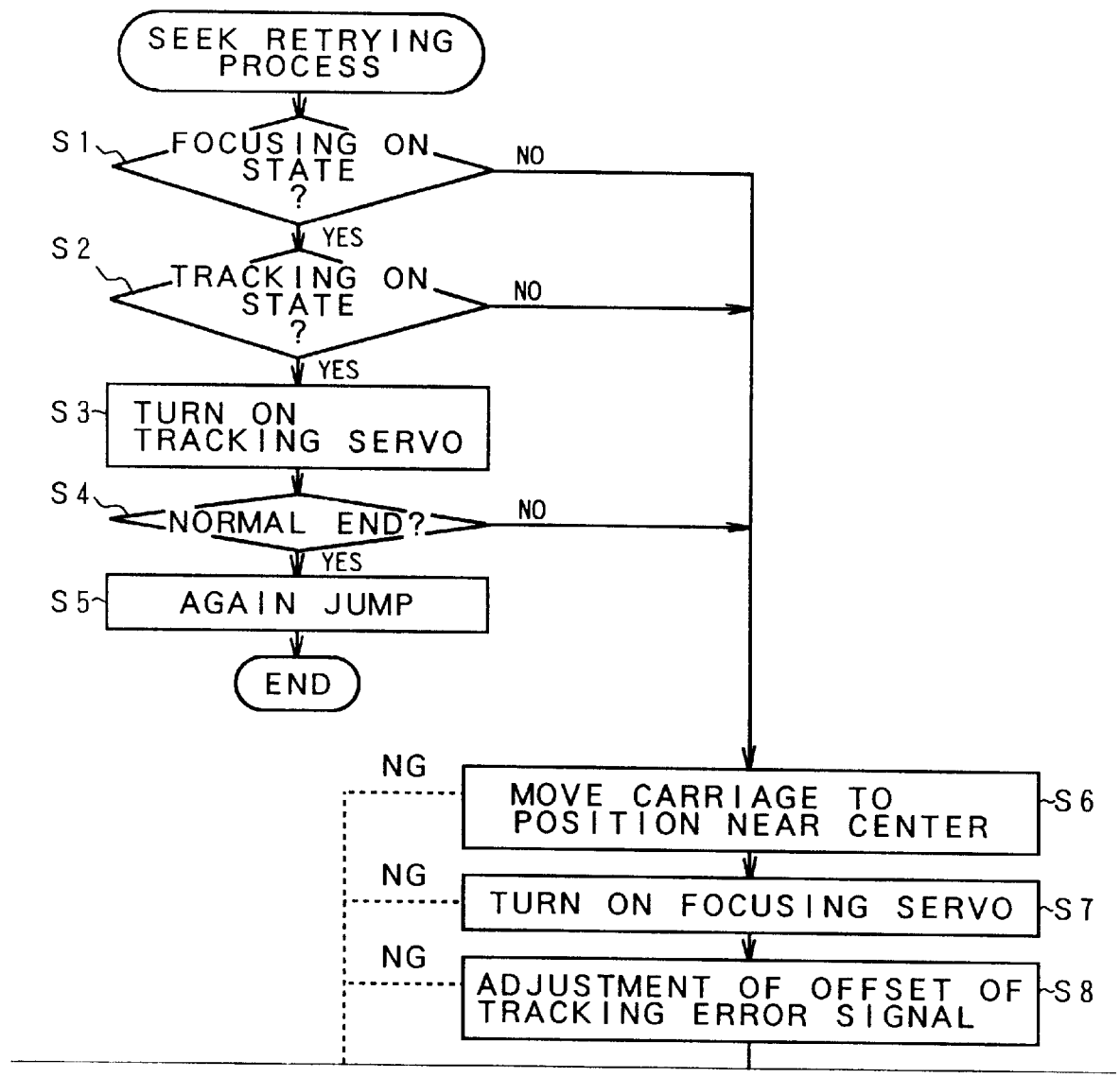
FIGS. 18A and 18B are flowcharts for a seek retrying process in which the light emission fine adjustment of the invention is performed.
Figure 18B:
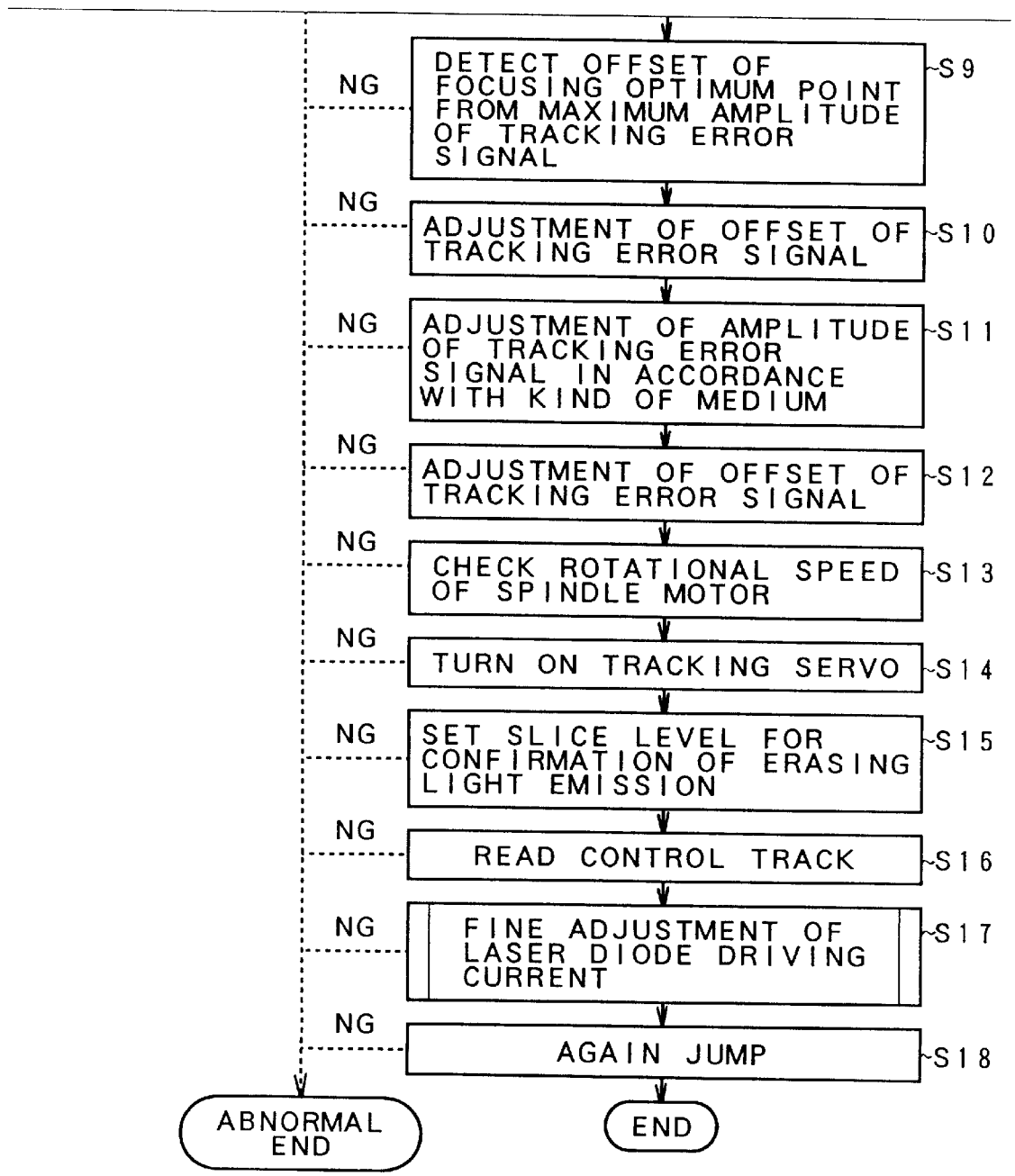

FIGS. 18A and 18B are flowcharts for the seek retrying process in which the light emission fine adjusting process of the invention is executed. When the seeking operation to the target track based on an upper command fails and a seek error occurs, the seek retrying process in FIGS. 18A and 18B is executed. In the seek retrying process, a check is made to see if the apparatus is in the focusing ON state. In step S2, a check is made to see if the apparatus is in the tracking ON state. If either one of the focusing state and the tracking state is OFF, an initializing process that is equivalent to the medium inserting process after step S6 is executed and, after that, a track re-jump for a seek retry is executed. When the apparatus is in the focusing ON state in step S1 and when it is in the tracking ON state in step S2, the tracking servo is turned on in step S3. After that, a check is made to see if the processing routine is normally finished in step S4. If YES, in step S5, a retry seeking operation for a re-jump to the target track is executed. On the other hand, even after the tracking servo is turned on in step S3, if the normal end in which the light beam is on-tracked to the target track is not obtained in step S4, the processing routine advances the processes in step S6 and subsequent steps. The processes in steps S6 to S8 are the same as processing steps S6 to S17 in the medium inserting process in FIGS. 8A and 8B. The process of the light emission fine adjustment of the laser diode according to the invention is included in step S17. Final step S18 relates to the case where the adjusting processes in steps S6 to S17 are normally finished and the seek retry for a re-jump to the target track is executed. When any one of the adjusting processes in steps S6 to S17 is abnormal, the processing routine is finished as abnormality.

Figure 19:
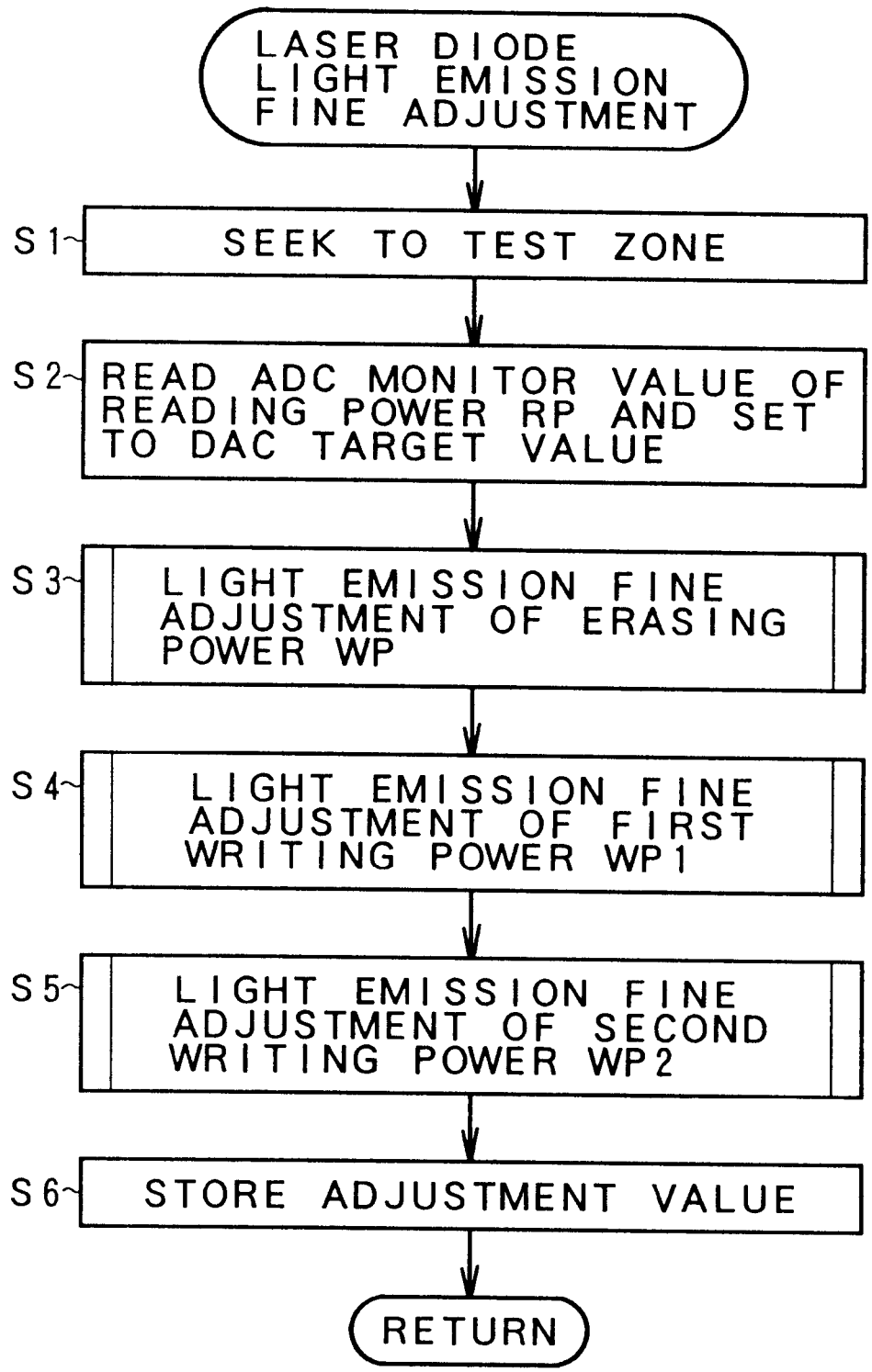
FIG. 19 is a generic flowchart for the light emission fine adjusting process in FIG. 10.

FIG. 19 is a schematic flowchart for the light emission fine adjustment of the laser diode according to the invention which is executed in step S17 for the medium inserting process in FIGS. 8A and 8B and in step S17 for the seek retrying process in FIGS. 18A and 18B. In the laser diode light emission fine adjustment, first in step S1, the beam spot is brought to the innermost test zone of the medium. In step S2, the ADC monitor value at the reading power is read and set to the APC target value in the automatic power control. In step S3, the light emission fine adjustment of the erasing power EP is executed. In step S4, the light emission fine adjustment of the first writing power WP1 is performed. Further, in step S5, the light emission fine adjustment of the second writing power WP2 is carried out. The adjustment values are stored in step S6 and the processing routine is finished. The light emission fine adjustment by each of the erasing power, the first writing power, and the second writing power in steps S3 to S5 relates to the case where the inserted medium uses the PWM recording and is the medium of 540 MB or MO cartridge medium of 640 MB in which the erasing operation is necessary. On the other hand, in case of the medium of 540 MB or 640 MB which uses the PWM recording of the direct overwrite corresponding type and in which the erasing operation is unnecessary, the light emission fine adjustment by each of the first writing power and the second writing power in steps S4 and S5 is executed and the light emission fine adjustment of the erasing power in step S2 is skipped. In the media of 128 MB and 230 MB using the PPM recording, the light emission fine adjustment by each of the erasing power and the first writing power in steps S3 and S4 is executed and the light emission fine adjustment of the second writing power in step S5 is skipped.

Figure 20:
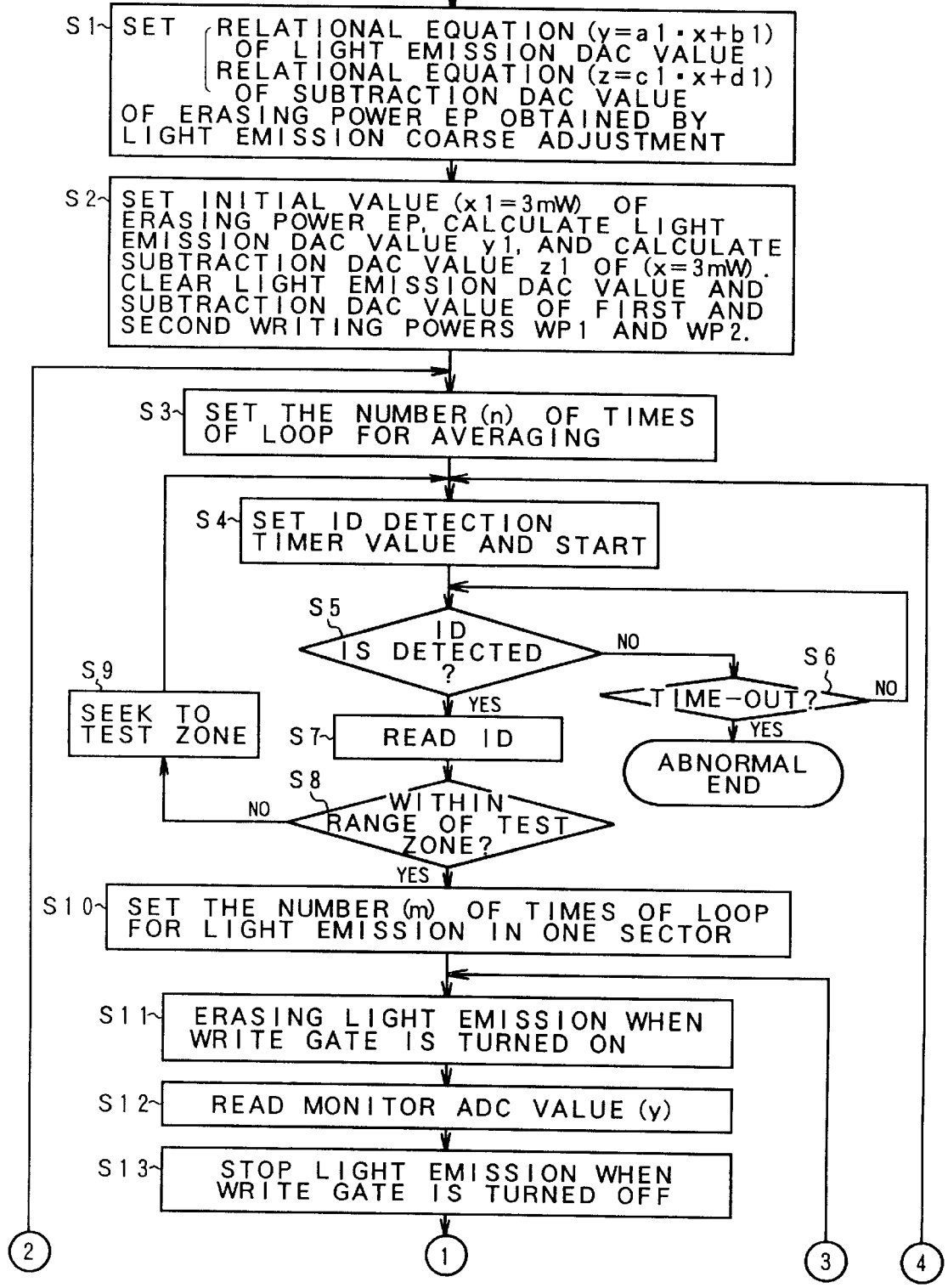
FIG. 20 is a flowchart for an erasing power fine adjustment according to the invention.
Figure 21:
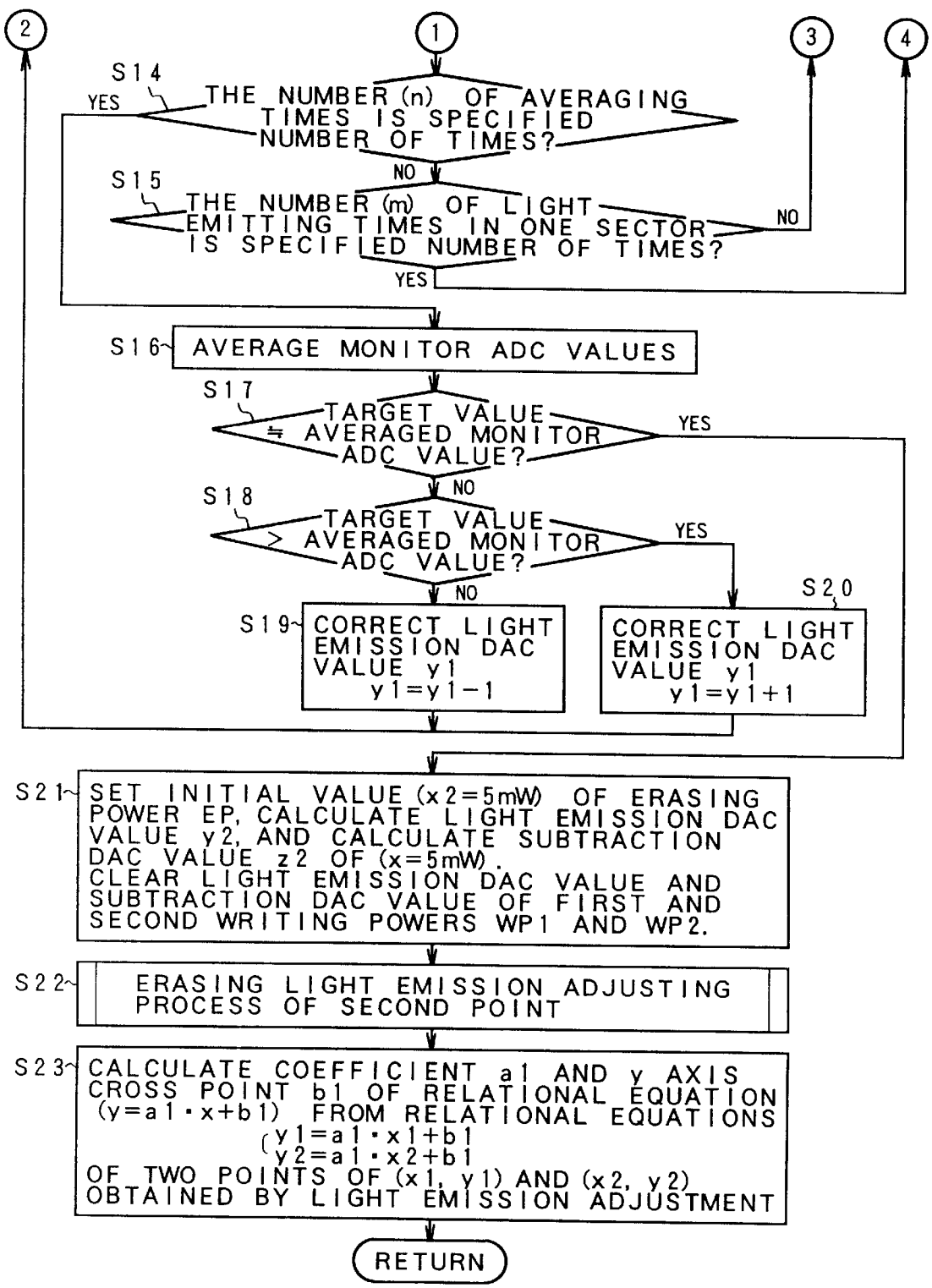
FIG. 21 is a flowchart for the erasing power fine adjustment subsequent to FIG. 20.

FIGS. 20 and 21 are flowcharts for the erasing power light emission fine adjustment in step S3 in FIG. 19. In FIG. 20, first in step S1, the relational equation of the light emission DAC value $$y = a1 \cdot x + b1$$

and the relational equation of the subtraction DAC value $$z = c1 \cdot x + d1$$

of the erasing power EP which were obtained by the light emission coarse adjustment in step S1 are set. In step S2, the testing power (x1=3 mW) for the first light emission by the erasing power is set and the light emission DAC value y1 is calculated from the relational equations in step S1. With respect to the testing power (x1=3 mW), the subtraction DAC value z1 is calculated from the relational equation of the subtraction DAC value. In this case, the light emission DAC values and the subtraction DAC values by the first and second writing powers WP1 and WP2 are cleared. Subsequently in step S3, the number (n) of loop times to average the monitor measurement values when the light emission is performed by the testing powers, namely, the number of times of the measurement is set. In step S4, a predetermined timer value is set into an ID timer to set a detecting time of the ID field and a process is started. In step S5, a check is made to see if the ID field has been detected. Until the ID field is detected, a check is made in step S6 to see if the ID timer has timed out. If the ID timer times out, the processing routine is finished as abnormality. When the ID detection is recognized in step S5, step S7 follows and the ID field is read. Since the track number at the present position can be recognized by the reading of the ID field, whether the present position lies within the test zone range or not is discriminated by comparing the recognized track number with the track number at the boundary of the predetermined test zone. If the present position is out of the test zone, step S9 follows and the light beam is again brought to the test zone. When the present position lies within the test zone in step S8, step S10 follows and the number (m) of times of loop of the light emission by the testing power in one sector is set. In step S11, the erasing light emission of the laser diode by the light emission DAC value y1 corresponding to the testing power of 3 mW which is set in step S2 by the turn-on of the write gate is performed. In this light emitting state, the monitor ADC value y is read in step S12. The light emission is stopped by the turn-off of the write gate in step S13. In step S14, a check is made to see if the number of times of averaging to execute the light emission adjustment of the erasing power, namely, the number (n) of sectors to perform the light emission adjustment of the erasing power has reached the specified number of times. If the value of (n) is less than the specified number of times, a check is made in step S15 to see whether the number (m) of times of the light emission in one sector is less than a specified number of times or not. Processes such that the value of (m) is less than the specified number of times, the processing routine is returned to step S11, the erasing light emission is performed by the next turn-on of the write gate, the monitor ADC value y at that time is read in step S12, and the light emission is stopped by the turn-off of the write gate in step S13 are repeated. In step S15, when the number (m) of times of the light emission in one sector reaches the specified number of times, the processing routine is returned to step S4. The timer value is again set into the ID timer and the process is started. The erasing light emission by the testing power in the next sector based on the new ID detection and the recognition of the test zone range are executed. By repeating the processes in steps S4 to S15 as mentioned above, if the number of monitor ADC values y which are used for averaging, namely, the number (n) of times of averaging reaches the specified number of times in step S14, step S16 follows and the monitor ADC values y obtained so far are averaged. The processing routine advances to step S17 in FIG. 21. The target value serving as a monitor measurement value of the gate power obtained as an APC target value in step S2 in FIG. 19 is compared with the averaged monitor ADC value, thereby discriminating whether they almost coincide or not. In case of an error in which the difference between the target value and the averaged monitor ADC value exceeds a specified value, step S18 follows. Whether the target value is larger than the averaged monitor ADC value or not is discriminated. When the target value is larger, since this means that the averaged monitor ADC value is small, the processing routine advances to step S20. A correction to increase the light emission DAC value y1 in which the testing power has been set is increased by predetermined one unit is performed. The processing routine is returned to step S3 in FIG. 20 and the light emission fine adjustment of the erasing power using the light emission DAC value y1 after the correction is executed. When the averaged monitor ADC value exceeds the target value in step S18, step S19 follows and a correction to reduce the light emission DAC value y1 by one unit is performed. Similarly, the processing routine is returned to step S3 in FIG. 20 and the light emission fine adjustment of the erasing power using the light emission DAC value y1 after the correction is executed. When the target value and the averaged monitor ADC value almost coincide with a specified error range in step S17, it is determined that the fine adjustment of the first testing power (x1=3 mW) has been finished. Step S21 follows. The testing power of the erasing power EP is set to (x2=5 mW) at the second point. The light emission DAC value y2 is similarly calculated and the subtraction DAC value z2 is calculated. In this case as well, the light emission DAC values and the subtraction DAC values by the first and second writing powers WP1 and WP2 are cleared. In step S22, the erasing light emission fine adjusting process at the second point of the testing power (x2=5 mW) is executed. The erasing light emission fine adjusting process at the second point in step S22 is the same as the processes in steps S3 to S20 at the first point. When the erasing light emission adjusting process at the second point is finished in step S22, step S23 follows. The coefficient a1 and y axis cross point b1 of the relational equation $$y=a1 \cdot x+b1$$

between the erasing power x and light emission DAC value y serving as its register instruction value are calculated from the relational equations of two points (x1, y1) and (x2, y2) obtained by the light emission adjustment. The calculated values of a1 and b1 are updated and registered into the EP light emission DAC coefficient table 184 shown in FIGS. 8A and 8B.

Figure 23:
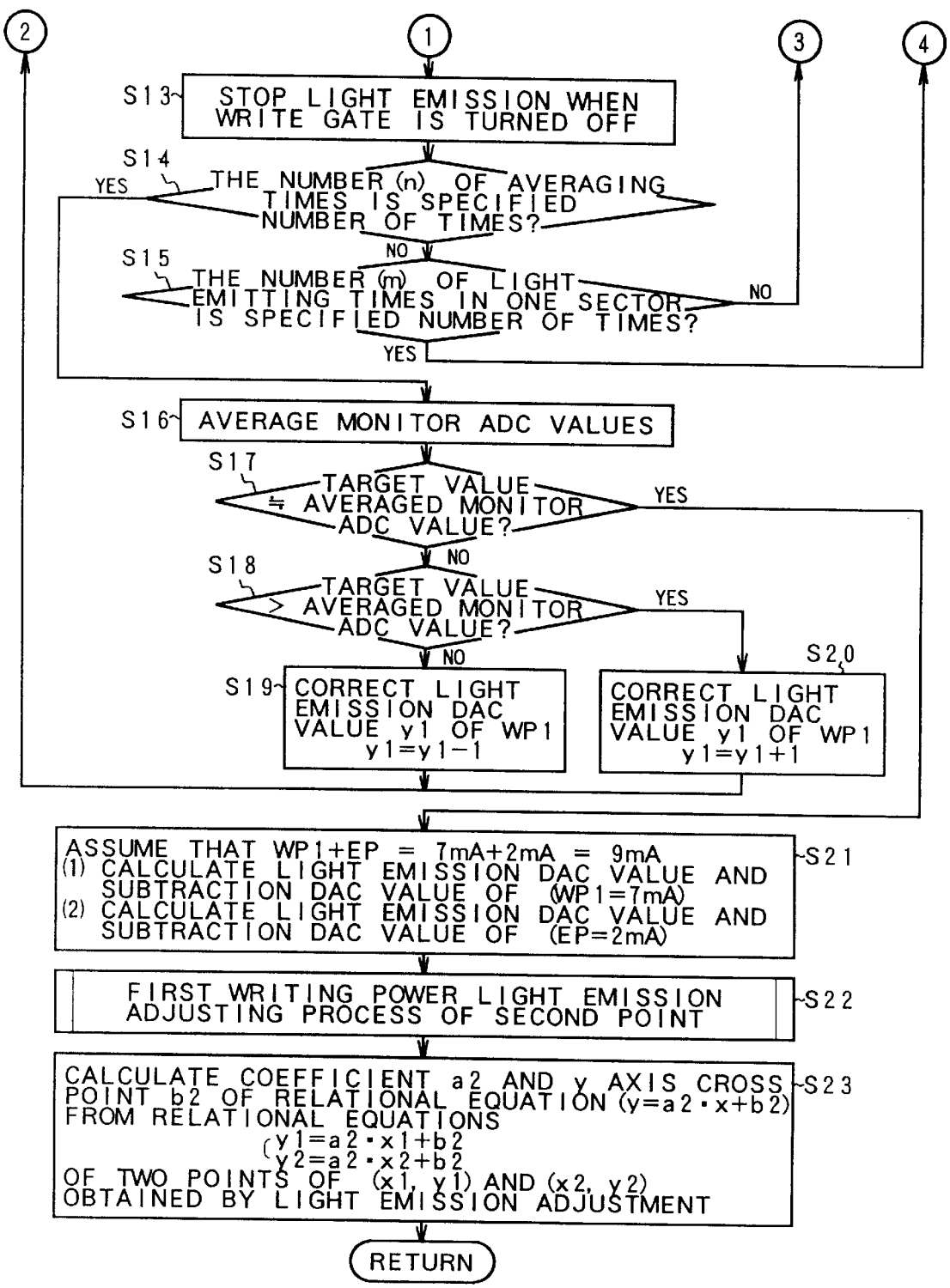
FIG. 23 is a flowchart for a first writing power fine adjustment subsequent to FIG. 22.

FIGS. 22 and 23 are flowcharts for the light emission fine adjustment of the first writing power WP1 in step S4 in FIG. 19. In FIG. 22, as for the first writing power light emission fine adjustment, first in step S1, the relational equation between the light emission DAC value and the subtraction DAC value at the erasing power EP which are obtained by the light emission coarse adjustment is set in a manner similar to step S1 for the erasing power fine adjustment in FIG. 21. After that, the relational equation between the light emission DAC value and the subtraction DAC value obtained by the coarse adjustment of the first writing power WP1 is set as shown in (2). Subsequently, in step S2, $$WP1+EP=3 \text{ mW}+2 \text{ mW}=5 \text{ mW}$$

is set as a testing power at the first point. To realize the first writing power fine adjustment, the light emission DAC value and the subtraction DAC value are calculated from the relational equation set in step S1 with respect to the first writing power (WP1=3 mW), and the light emission DAC value and the subtraction DAC value are calculated from the relational equation which is set in step S1 with regard to the erasing power (EP=2 mW). In this case, the light emission DAC value and the subtraction DAC value at the second writing power WP2 are cleared. Processes in step S3 to step S20 in FIG. 23 are fundamentally the same as those of the erasing power light emission fine adjustment in FIGS. 20 and 21. That is, a different point is that in step S21, in the light emission of the laser diode by the turn-on of the write gate, the light emission of 5 mW is executed by the current addition due to each of the light emission DAC instruction values by the first writing power WP1 and erasing power EP, respectively. In steps S19 and S20 in FIG. 23, the correction in the case where the target value and the averaged monitor DAC value don't coincide within a predetermined error range differs with respect to a point that the light emission DAC value y1 of the first writing power WP1 is corrected. When the averaged monitor DAC value of the first time coincides with the target value within the specified range in step S17 in FIG. 23, step S21 follows and the setting of the testing power of the second time is performed. Although the power is the same as the erasing power (=2 mW) with respect to the second point, it is increased to the first writing power WP1 (=7 mW) and the testing power is set to 9 mW. With respect to the testing power at the second point as well, in a manner similar to the above, the light emission DAC value and the subtraction DAC value of each of the set light emitting powers are calculated and, after that, the light emission adjusting process at the first writing power at the second point is executed in step S22. The light emission adjusting process at the first writing power at the second point is the same as the processes in a range from step S3 in FIG. 22 to step S20 in FIG. 23. When the light emission adjusting process at the first writing power at the second point in step S22 is finished, in step S23, the coefficient a2 and y axis cross point b2 of the relational equation $$y=a2 \cdot x+b2$$

of the first writing power are calculated from the relational equation at two points (x1, y1) and (x2, y2) regarding the first writing power obtained by the light emission adjustment and the WP1 light emission DAC table in FIGS. 8A and 8B is updated and registered.

Figure 24:
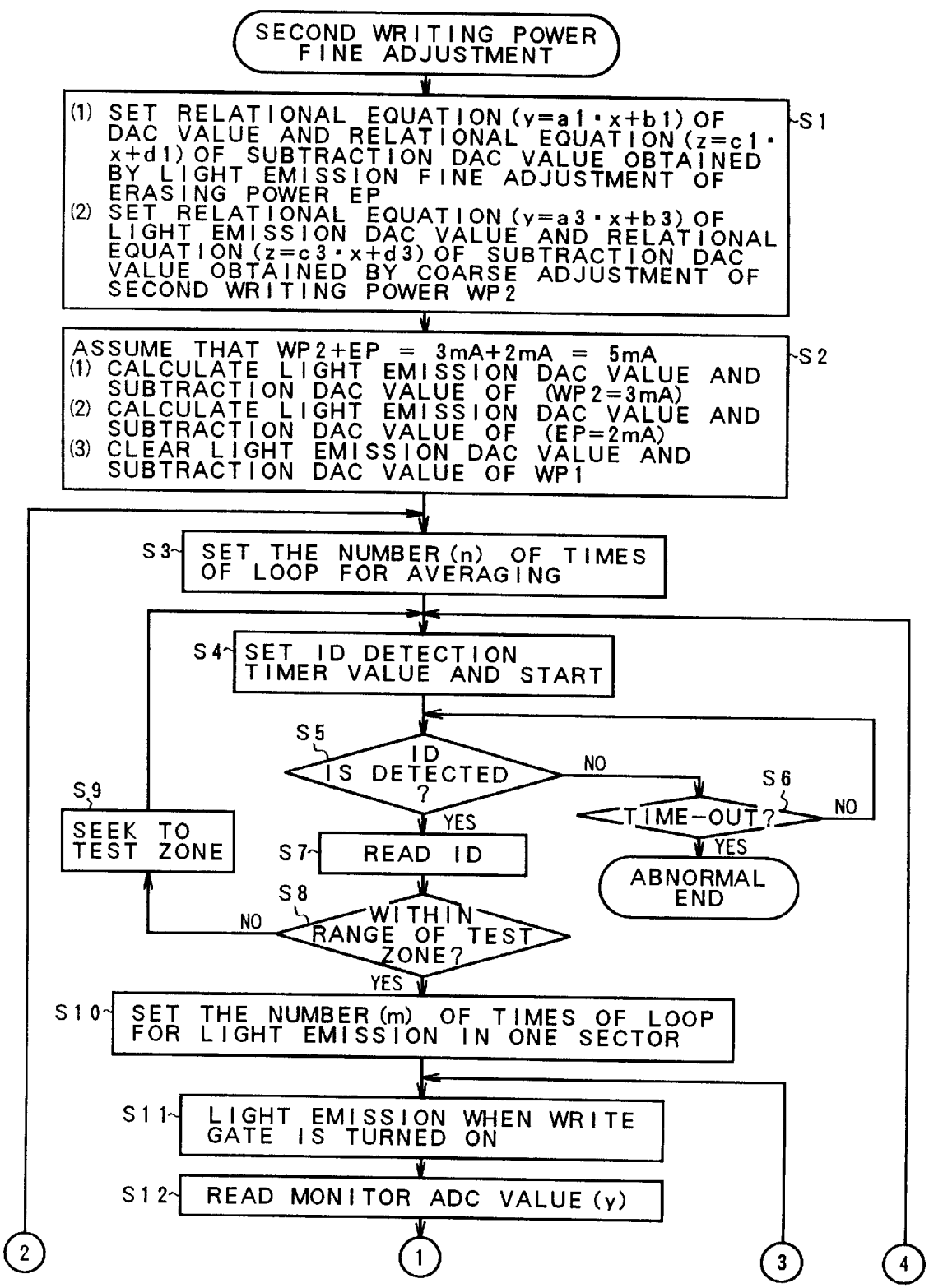
FIG. 24 is a flowchart for a second writing power fine adjustment according to the invention.
Figure 25:
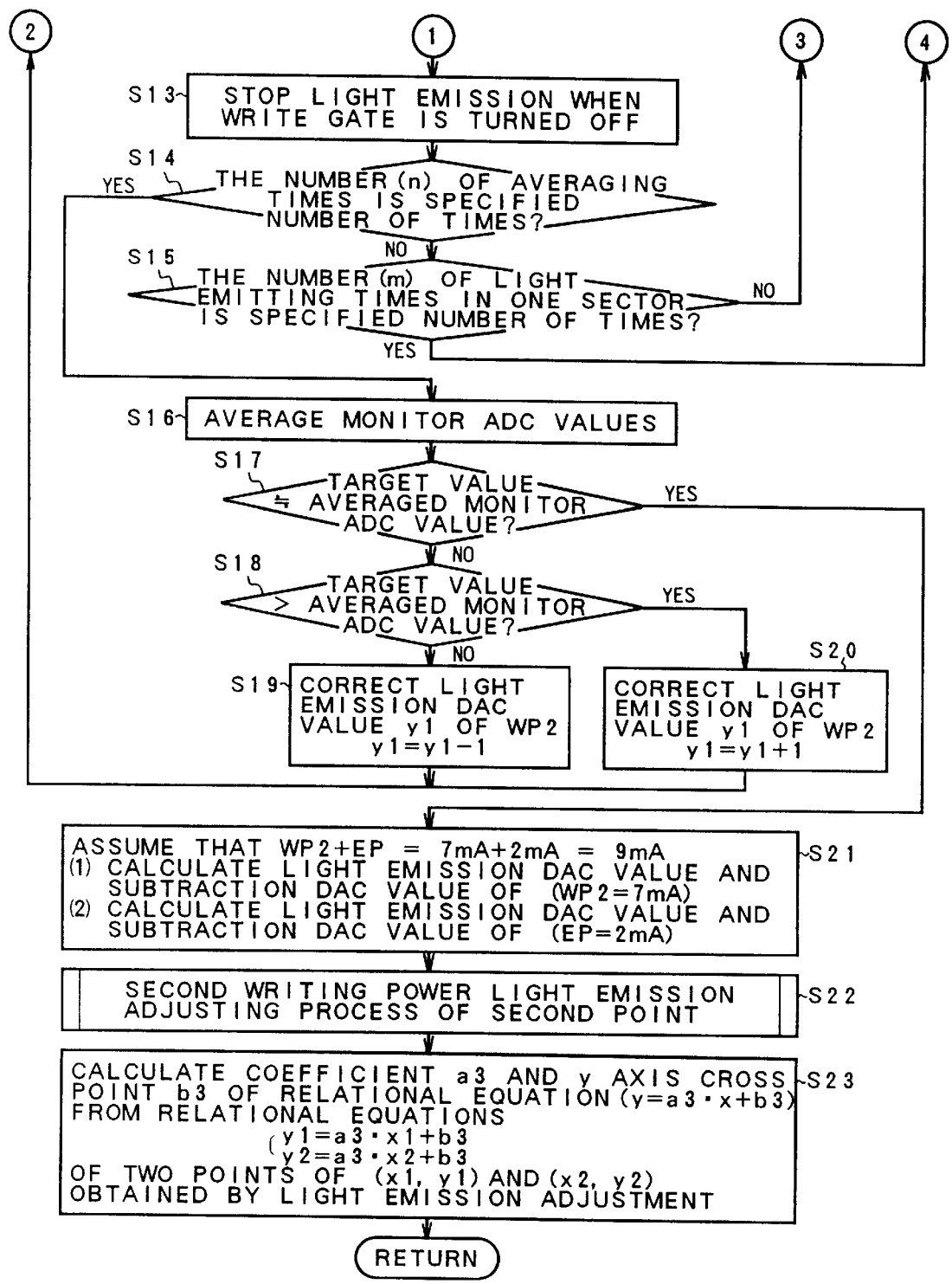
FIG. 25 is a flowchart for the second writing power fine adjustment subsequent to FIG. 24.

FIGS. 24 and 25 are flowcharts for the light emission fine adjustment of the second writing power WP2 in step S5 in FIG. 19. In FIG. 24, in the light emission fine adjustment of the second writing power, first in step S1, in a manner similar to the light emission fine adjustment of the first writing power, after a relational equation between the light emission DAC value and the subtraction DAC value obtained by the light emission fine adjustment of the erasing power EP is set, a relational equation between the light emission DAC value and the subtraction DAC value of the second writing power WP2 obtained by the light emission coarse adjustment is set. In step S2, the testing power at the first point is set by $$WP2+EP=3 \text{ mW}+2 \text{ mW}=5 \text{ mW}$$

A light emission DAC value and a subtraction DAC value of each power are calculated from the relational equations set in step S1, respectively. The light emission fine adjustment of the second writing power of the first time is executed in steps S3 to S20. The light emission fine adjustment of the second writing power of the first time is the same as the light emission adjustment of the first writing power in FIGS. 22 and 23. In step S17 in FIG. 25, when the averaged monitor DAC value coincides with the target value within a specified error range by the light emission adjustment of the second writing power at the first point, step S21 follows. The testing power of 9 mW at the second point is set and the light emission DAC value and the subtraction DAC value corresponding to each power are calculated. After that, the light emission adjusting process of the second writing power at the second point is executed in step S22. In final step S23, the coefficient a3 and y axis cross point b3 of a relational equation $$y=a3 \cdot x+b3$$

of the second writing power WP2 are calculated from the relational equation at two points obtained by the light emission adjustment and are updated and registered into the WP2 light emission DAC table 192 in FIGS. 8A and 8B. In the case of the cartridge medium of 540 MB or 640 MB of the direct overwrite corresponding type, it is sufficient to substitute the erasing power EP for the assisting power AP in FIGS. 20 to 25 and to perform the light emission fine adjustment.

In the light emission fine adjustment of each of the erasing power, the first writing power, and the second writing power shown in FIGS. 20 to 25, in step S7, the track number is recognized from the read information of the ID field, the end position of the ID field is recognized from the ID read information, and the light emission fine adjustment is performed. As another embodiment of the invention, however, the end of the ID field can be also detected by using a sector mark and an address mark included in the ID field and, further, an RF detection signal of the ID field or the like. In the discrimination of the test zone range as well, a detection signal of the carriage position sensor 56 provided to detect the absolute position of the carriage can be also used instead of the detection information of the ID field.

Figure 26:
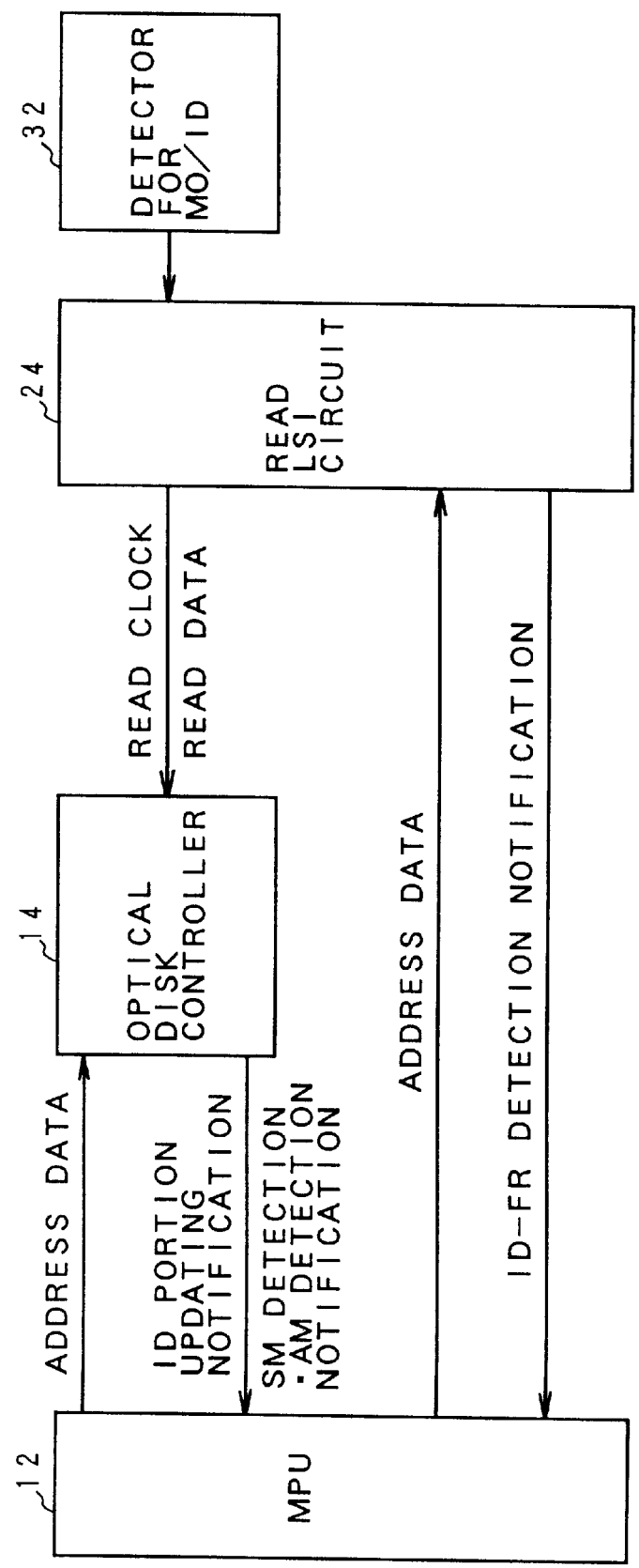
FIG. 26 is a circuit block diagram showing formation information of an optical disk drive necessary for detection of an ID end by a light emission timing control unit in FIGS. 8A and 8B.

FIG. 26 is a block diagram showing the ID detection information which is obtained for the detection of the end position of the ID field by the light emission timing control unit 168 provided for the light emission fine adjustment processing unit 164 shown in FIGS. 8A and 8B. The read LSI circuit 24 demodulates a read clock and read data on the basis of the ID signal and MO signal from the detector 32 for ID/MO and supplies them to the optical disk controller 14. The optical disk controller 14 sends an ID field updating notification, a servo mark detecting notification, and further, an address mark detecting notification to the MPU 12 from the read data of the ID field. The read LSI circuit 24 can send an ID-RF detecting notification to the MPU 12 by the processing signal of the ID derived from the detector 32 for ID/MO. Address data to read access, for example, a track number and a sector number are supplied from the MPU 12 to the optical disk controller 14 and read LSI circuit 24 and ID information and read data corresponding to those numbers are obtained.

Figure 27:
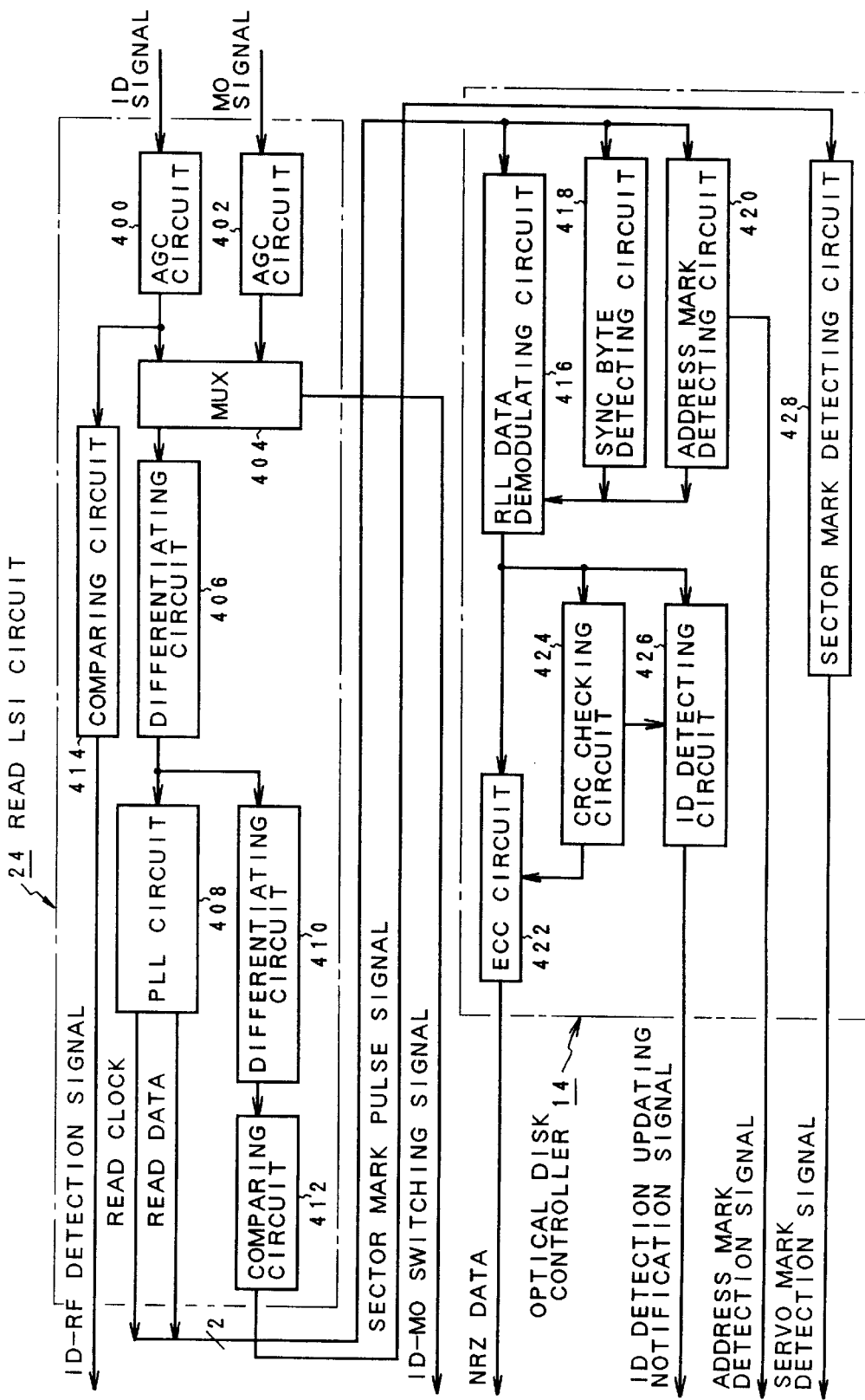
FIG. 27 is a reading system of a block diagram of a read LSI circuit and an optical disk controller in FIG. 26.

FIG. 27 is a block diagram of the reading system of the read LSI circuit 24 and optical disk controller 14 in FIG. 26. In the read LSI circuit 24, after the ID signal from the detector side is amplified by an AGC circuit 400 and, it is input to a multiplexer 404. After the MO signal is also amplified by an AGC circuit 402, it is input to the multiplexer 404. The multiplexer 404 selects either one of the AGC circuits 400 and 402 by an ID/MO switching signal and outputs a signal from the selected AGC circuit. When the ID field end position is detected according to the invention, the multiplexer 404 is switched to the AGC circuit 400 side and the ID signal is output to a differentiating circuit 406. The differentiating circuit 406 detects the peak of the ID signal at a zero-cross timing and supplies a detection pulse to a PLL circuit 408. The circuit 406 generates a read data signal for a period of time of the ID field. The PLL circuit 408 outputs the read data from the MO signal for a period of time of the data field. An output of the differentiating circuit 406 is further supplied to a differentiating circuit 410. A signal which has been differentiated twice is compared with a predetermined threshold value by a comparing circuit 412, thereby obtaining a sector pulse signal included in the ID field. An output of the AGC circuit 400 which received the ID signal is sent to a comparing circuit 414. The ID signal comprising a predetermined high frequency component is cut by a predetermined slice level, so that an RF detection signal which is turned on for the period of time of the ID signal can be obtained. The reading system of the optical disk controller 14 has an RLL data demodulating circuit 416, a sync byte detecting circuit 418, an address mark detecting circuit 420, an ECC circuit 422, a CRC checking circuit 424, an ID detecting circuit 426, and a sector mark detecting circuit 428. In the read data from the read LSI circuit 24, for instance, a 1-7 RLL code is first inversely converted by the RLL data demodulating circuit 416. That is, in the writing system of the optical disk controller 14, since the write data is converted to, for example, the 1-7 RLL code, it is inversely converted upon reading. In this case, a result of the detection of the sync byte of the ID field by the sync byte detecting circuit 418 and a result of the detection of the address mark by the address mark detecting circuit 420 are used and the data field in the sector is recognized. The demodulation data of the RLL data demodulating circuit 416 is input to the ECC circuit 422.

When an ECC code is formed from the write data, the writing system forms a CRC code and adds it for (the write data+the ECC code) as a target. Therefore, the CRC checking circuit 424 performs a CRC check of the read data and sends a check result to the ECC circuit 422. When there is no CRC check error, the ECC circuit 422 detects and corrects an error of the read data and outputs the corrected data as NRZ data. In this instance, the ID detecting circuit 426 detects the ID field from the read data of the ID field and outputs an updating notification signal of the ID detection at an end timing of the ID field to the MPU 12. The address mark detecting circuit 420 detects the address mark included in the read data of the ID field and outputs an address mark detection signal to the MPU 12. Further, the sector mark detecting circuit 428 detects the sector mark existing at the head position of the ID field and outputs a sector mark detection signal to the MPU 12.

FIGS. 28A to 28G are time charts for the ID signal, RF detection signal, sector mark detection signal, first address mark detection signal, second address mark detection signal, and ID detection completion signal for the sector information at the time of the light emission fine adjustment. First, in the sector information of FIG. 28A, a servo mark SM, a VFO, a first address mark AM1, first ID information 1, a second address mark AM2, and second ID information 2 have been recorded in the ID field at the head of the sector. The recording information of the ID field is shown as an example in the case of the PWM recording medium. In the case of the PPM recording medium, there are three address marks of first to third address marks AM1 to AM3. With respect to the above ID field, as shown in FIG. 28D, the ID field signal is derived as a high frequency signal that is determined by an interval between the recording pits. By setting a predetermined slice level, the RF detection signal of FIG. 28C is set to the ON state for a period of time of the ID field. Therefore, the end of the ID field can be detected at a timing when the RF detection signal is switched from ON to OFF. The sector mark detection signal of FIG. 28D is turned on at the end time point of the sector mark. The first address mark detection signal of FIG. 28E is turned on at the end time point of the first address mark AM1. The second address mark detection signal of FIG. 28F is turned on at the end time point of the second address mark AM2. Times T1, T2, and T3 which are required from the turn-on of the sector mark detection signal, first address mark detection signal, and second address mark detection signal to the end time point of the ID field of the sector information have been predetermined. The times T1 to T3 are times which are determined by the radial position of the medium of the track where the sector information is read, the length in the circumferential direction of the ID field, and the rotational speed of the medium by the spindle motor. Therefore, with respect to the detection of the end position of the ID field, it will be understood that it is sufficient to turn on the ID detection completion signal as shown in FIG. 28G at the time points when the waiting times of the predetermined specified times T1, T2, and T3 elapse after the turn-on of the sector mark detection signal, the first address mark detection signal, and the second address mark detection signal. With regard to the RF detection signal of FIG. 28C, it is sufficient to turn on the ID detection completion signal at the timing when it is switched from ON to OFF.

Figure 29:
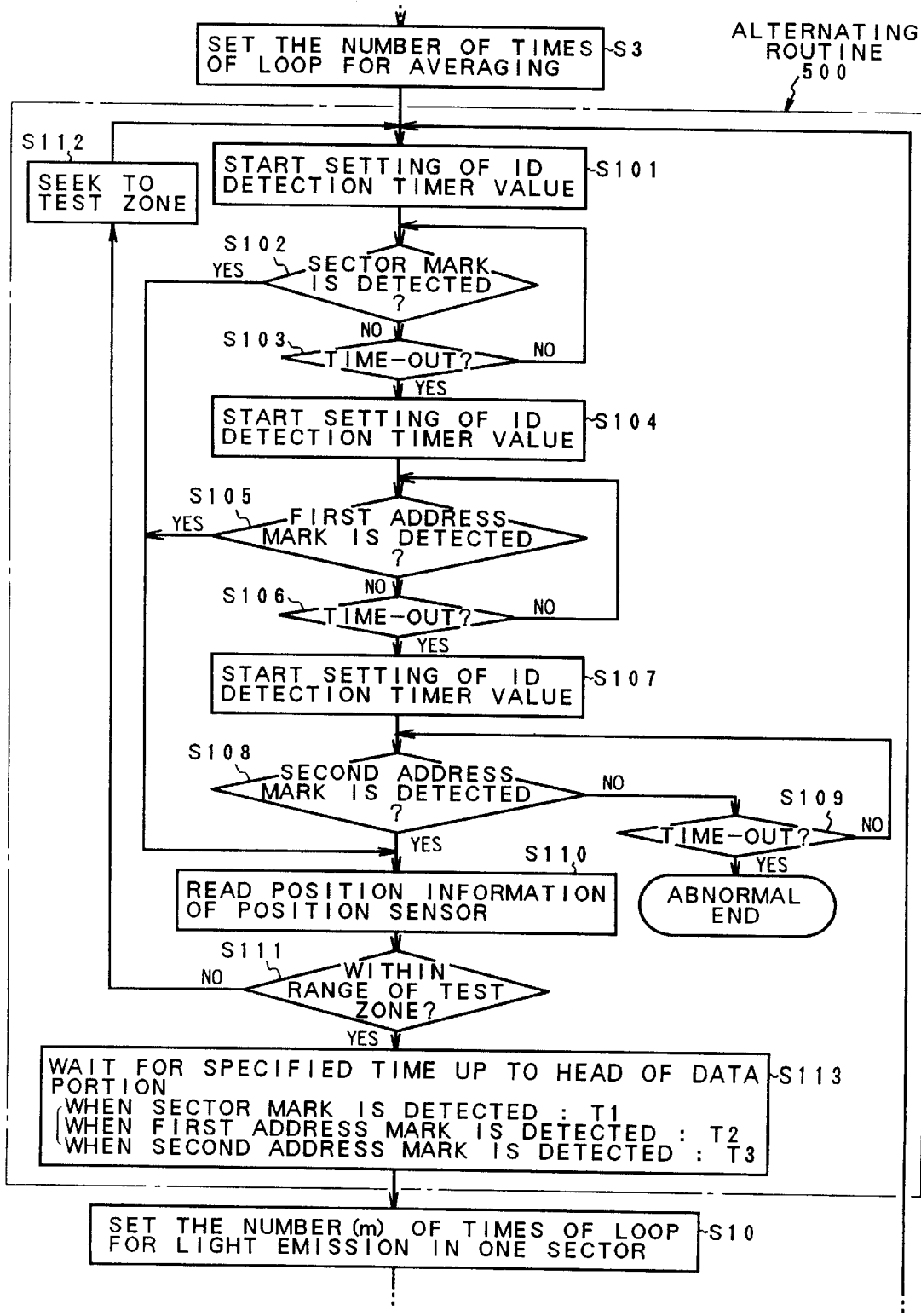
FIG. 29 is a flowchart for a processing routine for detecting an end of an ID field on the basis of a sector mark and an address mark and detecting for a test zone by a carriage position sensor.

FIG. 29 is a flowchart for the light emission fine adjustment in the case where the sector mark detection signal and the address mark detection signal in FIGS. 28A to 28G are used for the ID field detection completion and the detection signal of the carriage position sensor 56 in FIG. 2 is used for discrimination about the test zone range. In the flowchart for the light emission fine adjustment, the processes between step S3 and step S10 in the light emission fine adjustment of each of the erasing power, the first writing power, and the second writing power in FIGS. 20, 22, and 24 are replaced by an alternating routine 500 shown by an alternate long and short dash line, so that each light emission fine adjustment can be realized. In the alternating routine 500 in FIG. 29, first in step S101, an ID detection timer value which is used for the detection of the ID field is set and the process is started. Whether the sector mark has been detected or not is discriminated in step S102. Until the sector mark is detected, a check is made in step S103 to see if the timer has timed out. When the sector mark is normally detected in step S102, step S110 follows and the position information of the carriage position sensor is read. In step S111, a check is made to see if the present position lies within the test zone range. If YES, step S113 follows. In this case, since the sector mark is detected, after the process has waited for the predetermined waiting time T1 with regard to the detection of the sector mark, the ID field detection completion is recognized and the processing routine advances to the processes in step S10 and subsequent steps. When the sector mark cannot be detected in step S102 and the timer times out in step S3, the ID detection timer value is again set in step S104 and the process is started. A check is made in step S105 to see if the first address mark AM1 has been detected. When the first address mark can be normally detected, the position information of the carriage position sensor is read in step S110. When it is recognized in step S111 that the present position exists in the test zone, in step S113, as a specified time to the head of the data field, in this case, the process waits for the specified time T2 at the time of the detection of the first address mark. After that, it is determined that the end of the ID field is detected. The processing routine advances to processes in step S10 and subsequent steps. When the first address mark AM1 cannot be detected in step S105 and the timer times out in step S106, the ID detection timer value is again set and the process is started in step S107. After that, the second address mark AM2 is detected in step S108. When the second address mark AM2 can be detected, the processing routine advances to step S113 through steps S110 and S111. When the second address mark is detected, the process waits for the specified time T3 to the head of the data field. The end of the ID field is detected and the processing routine advances to processes in step S10 and subsequent steps. When the second address mark cannot be detected in step S108 and the timer times out in step S109, the processing routine is finished as abnormality. On the basis of the position information of the carriage position sensor in step S111, when it is determined that the present position is out of the test zone range in the discrimination about whether the present position lies within the test zone range or not, step S112 follows. The light beam is again brought to the test zone. After that, the processes are repeated from step S101.

Figure 30:
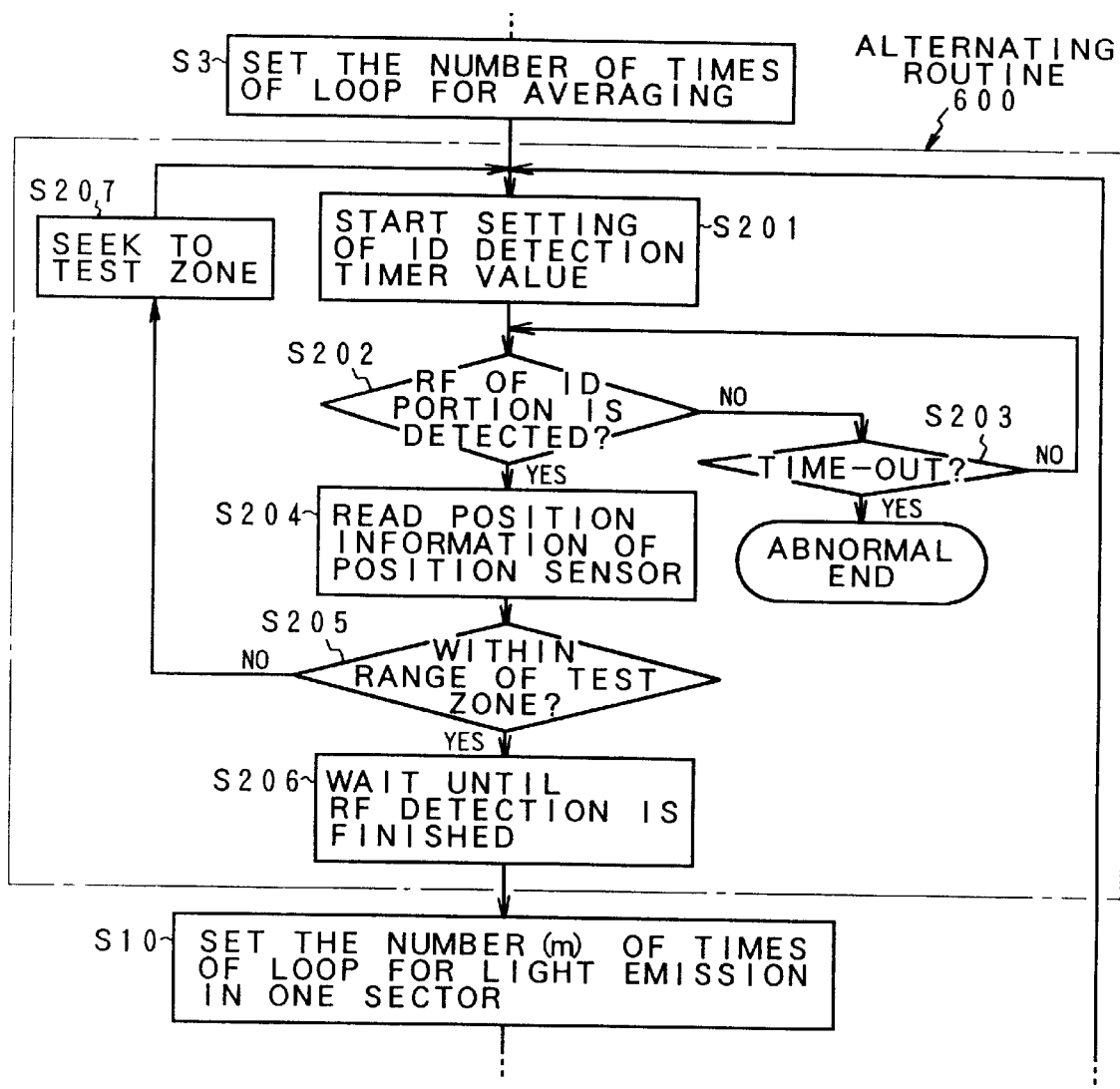
FIG. 30 is a flowchart for a processing routine for detecting the end of the ID field on the basis of an RF detection signal of an ID field and detecting a test zone by a carriage position sensor.

FIG. 30 is a flowchart of another embodiment for detecting the end position of the ID field in the light emission fine adjustment of the invention. In a manner similar to FIG. 30, this flowchart is shown as an alternating routine 600 that is substituted for processes in steps S3 to S10 in FIGS. 20, 22, and 24. In the alternating routine 600, first in step S201, an ID detection timer value is set and the process is started. In step S202, a check is made to see if the RF signal of the ID field has been detected. Since the RF detection signal of the ID field is turned on by the reading of the ID field as shown in FIG. 28C, the RF detection of the ID field is recognized by the turn-on of the RF detection signal. The processing routine advances to step S204 and the position information of the carriage position sensor is read. In step S205, when it is recognized that the present position lies within the test zone range, the process waits until the end of the RF detection in step S206. When the ID field is finished, as shown in FIG. 28C, since the RF detection signal is turned off from the ON state, the end of the RF detection is recognized. The processing routine advances to processes in step S10 and subsequent steps. When the RF signal of the ID field is not detected in step S202 and the timer times out in step S203, the processing routine is finished as abnormality. When the present position is out of the test zone range in step S205, the processing routine is returned to step S207 and the light beam is brought to the test zone. After that, the processes are repeated from step S201. Further, as another embodiment for detecting the end position of the ID field, one or a plurality of detection signals among the RF detection signal, sector mark detection signal, and first and second address mark detection signals of FIGS. 28C, 28D, 28E, and 28F are properly combined and in the case where some specific signals among the detection signals cannot be detected, the end position of the ID field is detected by the other detection signals, thereby raising redundancy and certainly detecting the end position of the ID field. The light emission driving for the light emission fine adjustment is performed in only the data field and the accurate light emission adjustment can be performed without being subjected to the fluctuation of the return light.

According to the invention as mentioned above, in the state in which the on-track control after the seeking to the test zone of the medium is validated, in case of performing the fine adjustment of the light emitting power of the laser diode while holding the automatic power control (APC) synchronously with the light emitting timing of the laser diode, whether the present position lies within the test zone range or not is discriminated at the time of the light emission by the testing power. When the present position is out of the test zone range, by again seeking to the head of the test zone, a situation such that the user data is erroneously broken at the time of the light emission fine adjustment that is executed in the on-track state can be certainly prevented. With respect to the light emission fine adjustment which is performed in the on-track state, the light emission fine adjustment by the light emission driving of the laser diode is executed from the time point of the detection of the end of the ID field of the sector, namely, from the head of the data field. Thus, the problem such that the fluctuation of the return light due to the light emission driving in the ID field is measured and the adjustment error is caused can be certainly prevented. The control of high precision of the light emitting power by the laser diode adapted to the high density recording medium of the PWM recording in which the light emission fine adjustment of high precision is required is realized. The reliability of the recording and reproduction of the high density recording medium can be remarkably improved.

The invention is not limited by the numerical values shown in the above embodiments. The processes of the light emission fine adjustment can be realized by a program control by the MPU or can be also realized by dedicated firmware or a program control of the DSP.

What is claimed is:

1. An optical storage apparatus comprising:
   a laser diode for emitting a light beam;
   a light emission current source circuit for supplying driving currents according to a plurality of powers to said laser diode;

an automatic power control unit for controlling a light emitting power of said laser diode to a specified target power;

a monitoring detector for receiving a laser beam from said laser diode and detecting a measuring power;

a monitoring power measuring unit for obtaining a monitor current derived from said monitoring detector as a power measurement value;

a light emission fine adjustment processing unit for supplying a light emitting current of a predetermined testing power to said laser diode in a state where an on-track control is validated after seeking to a predetermined test zone, for driving said laser diode to emit light, for adjusting said light emitting current so that said measuring power is equal to said target power, and for obtaining a relation between said light emitting current and said target light emitting power on the basis of said adjustment result; and a test zone confirming unit for discriminating whether a present position of the light beam lies within a range of said test zone or not at the time of the start of the light emission adjustment of said laser diode by said light emission fine adjustment processing unit and for activating said light emission adjustment when the present position lies within said test zone range.

2. An apparatus according to claim 1, wherein said light emission fine adjustment processing unit sequentially instructs the light emission at predetermined testing powers to said light emission current source circuit in a state where an on-track control is validated after seeking to a predetermined zone, drives said laser diode to emit light, adjusts an instruction value for said light emission current source circuit so that said measuring power is equal to said target power, and obtains a relation between the instruction value for said light emission current source circuit and an arbitrary light emitting power on the basis of said adjustment result, said apparatus further comprises a subtraction current source circuit for subtracting a specified subtraction current corresponding to a difference between said light emitting power and said target power from a photo-sensing current of said monitoring detector, converting a resultant current to, a monitor current, and feeding back said monitor current to said automatic power control unit, said monitoring power measuring unit reads said monitor current derived from said subtraction current source circuit as a power measurement value, and said light emission fine adjustment processing unit sequentially instructs the light emission at testing powers at least two predetermined points to said light emission current source circuit in a state where the on-track control is validated after seeking to the predetermined test zone, drives said laser diode to emit light, instructs specified subtraction currents corresponding to said testing powers at said two points to said subtraction current source circuit, adjusts the instruction value of said light emission current source circuit so that the measuring power of said monitoring power measuring unit is equal to said target power, and obtains the relation between the instruction value of said light emission current source circuit and said arbitrary light emitting power on the basis of said adjustment result.

3. An apparatus according to claim 1, wherein said test zone confirming unit discriminates whether the present position lies within said track zone range or not by reading an ID field of a medium track.

4. An apparatus according to claim 1, wherein in said test zone confirming unit, an absolute position of a positioner for moving an image forming position of the light beam in a radial direction of a medium is detected by a position sensor, thereby discriminating whether the present position lies within said test zone range or not.

5. An apparatus according to claim 1, wherein when the present position is out of said test zone range, said test zone confirming unit allows a seeking operation to the test zone to be again executed.

6. An apparatus according to claim 1, wherein when the present position cannot be recognized, said test zone confirming unit inhibits the light emission adjustment of said laser diode.

7. An apparatus according to claim 1, wherein as items for recognizing the present position, said test zone confirming unit has an item of a reading of an ID field of a medium track and an item of an absolute position of a positioner for moving a light beam image forming position of an objective lens detected by a position sensor in a radial direction of a medium, any one of said plurality of items is selected to thereby recognize the present position, and when the present position cannot be recognized by the selected item, the item is switched to another item, thereby recognizing the present position.

8. An apparatus according to claim 1, wherein said light emission fine adjustment processing unit and said test zone confirming unit execute a light emission fine adjustment of said laser diode that is accompanied with a confirmation of the test zone by an initial operation just after a medium cartridge was inserted.

9. An apparatus according to claim 1, wherein said light emission fine adjustment processing unit and said test zone confirming unit execute a light emission fine adjustment of said laser diode that is accompanied with a confirmation of the test zone by a retrying operation.

10. An apparatus according to claim 1, wherein in a state where a command from an host apparatus is not issued, said light emission fine adjustment processing unit and said test zone confirming unit execute a light emission fine adjustment of said laser diode that is accompanied with a confirmation of the test zone at predetermined time intervals.

11. An apparatus according to claim 1, wherein said light emission fine adjustment processing unit adjusts each of an erasing power and a first writing power in the case where a medium loaded into said apparatus is a recording medium of a pit position modulation (PPM), and adjusts each of said erasing power, said first writing power, and a second writing power in the case where the medium loaded into said apparatus is a recording medium of a pulse width modulation (PWM).

12. An apparatus according to claim 1, further comprising an automatic power control holding unit for holding a control of said automatic power control unit for a light emission driving period of time when said laser diode is light emission driven by said light emission fine adjustment processing unit.

13. An optical storage apparatus comprising:

a laser diode for emitting a light beam;

a light emission current source circuit for supplying driving currents according to a plurality of powers to said laser diode;

an automatic power control unit for controlling a light emitting power of said laser diode to a specified target power;

a monitoring detector for receiving a laser beam from said laser diode and detecting a measuring power;

a monitoring power measuring unit for obtaining a monitor current derived from said monitoring detector as a power measurement value;

a light emission fine adjustment processing unit for supplying a light emitting current of a predetermined testing power to said laser diode in a state where an on-track control is validated after seeking to a predetermined test zone, for driving said laser to emit light, for adjusting said light emitting current so that said measuring power is equal to said target power, and for obtaining a relation between said light emitting current and said target light emitting power on the basis of said adjustment result; and a light emission timing control unit for, in the case where said laser diode is light emission adjusted by said light emission fine adjustment processing unit, allowing the light emission adjustment of said laser diode to be executed in only a data field while avoiding an ID field with respect to each of track sectors which are on-track controlled.

14. An apparatus according to claim 13, wherein said light emission fine adjustment processing unit sequentially instructs the light emission at predetermined testing powers to said light emission current source circuit in a state where an on-track control is validated after seeking to a predetermined zone, drives said laser diode to emit light, adjusts an instruction value for said light emission current source circuit so that said measuring power is equal to said target power, and obtains a relation between the instruction value for said light emission current source circuit and an arbitrary light emitting power on the basis of said adjustment result, said apparatus further comprises a subtraction current source circuit for subtracting a specified subtraction current corresponding to a difference between said light emitting power and said target power from a photosensing current of said monitoring detector, converting a resultant current to a monitor current, and feeding back said monitor current to said automatic power control unit, said monitoring power measuring unit reads said monitor current derived from said subtraction current source circuit as a power measurement value, and said light emission fine adjustment processing unit sequentially instructs the light emission at testing powers at at least two predetermined points to said light emission current source circuit in a state where the on-track control is validated after seeking to the predetermined test zone, drives said laser diode to emit light, instructs specified subtraction currents corresponding to said testing powers at said two points to said subtraction current source circuit, adjusts the instruction value of said light emission current source circuit so that the measuring power of said monitoring power measuring unit is equal to said target power, and obtains the relation between the instruction value of said light emission current source circuit and said arbitrary light emitting power on the basis of said adjustment result.

15. An apparatus according to claim 13, wherein at a time point when an updating of an ID detection is notified said light emission timing control unit recognizes that the ID field is finished and the present position exists at the head of the data field, thereby allowing the light emission adjustment of said laser diode to be executed.

16. An apparatus according to claim 13, wherein at a time point when a specified time elapses after a sector mark included in said ID field was detected, said light emission timing control unit recognizes that the ID field is finished and a present position of the light beam exists at the head of the data field, thereby allowing the light emission adjustment of said laser diode to be executed.

17. An apparatus according to claim 13, wherein at a time point when a specified time elapses after an address mark included in said ID field was detected, said light emission timing control unit recognizes that the ID field is finished and the present position exists at the head of the data field, thereby allowing the light emission adjustment of said laser diode to be executed.

18. An apparatus according to claim 13, wherein at a time point when an output obtained by comparing a read signal of said ID field with a predetermined slice level does not fluctuate, said light emission timing control unit recognizes that the ID field is finished and the present position exists at the head of the data field, thereby allowing the light emission adjustment of said laser diode to be executed.

19. An apparatus according to claim 13, wherein said light emission timing control unit intermittently emits light in said data field a plurality of times on the basis of a physical length of said data field, said physical length being determined by a kind of medium and a rotational speed of the medium, and wherein said monitoring power measuring unit obtains said power measurement value each time the light is emitted.

20. An apparatus according to claim 13, wherein when an end of said ID field cannot be recognized, said light emission timing control unit inhibits the light emission adjustment of said laser diode.

21. An apparatus according to claim 13, wherein as items for discriminating an end of said ID field, said light emission timing control unit has an item of an updating time point of the ID detection, an item of an elapsed time point of a predetermined time from a detection of a sector mark, an item of an elapsed time point of a predetermined time from a detection of an address mark, and an item of a time point when a signal obtained by comparing an ID signal with a predetermined slice level does not fluctuate, any one of said plurality of discrimination items is selected to thereby discriminate the end of the ID field, and when the end of the ID field cannot be discriminated by the selected discrimination item, said discrimination item is switched to another discrimination item, and the end of the ID field is discriminated.

22. An apparatus according to claim 13, wherein said light emission fine adjustment processing unit and said light emission timing control unit execute a light emission fine adjustment of said laser diode in only the data field while avoiding the ID field by an initial operation just after a medium cartridge was inserted.

23. An apparatus according to claim 13, wherein said light emission fine adjustment processing unit and said light emission timing control unit execute a light emission fine adjustment of said laser diode in only the data field while avoiding the ID field by a retrying operation.

24. An apparatus according to claim 13, wherein said light emission fine adjustment processing unit and said light emission timing control unit execute a light emission fine adjustment of said laser diode in only the data field while avoiding the ID field at predetermined time intervals in case of a state where no command is issued from an upper apparatus.

25. An apparatus according to claim 13, wherein said light emission fine adjustment processing unit adjusts each of an erasing power and a first writing power in the case where a medium loaded into said apparatus is a recording medium of a pit position modulation (PPM), and adjusts each of said erasing power, said first writing power, and a second writing power in the case where the medium loaded into said apparatus is a recording medium of a pulse width modulation (PWM).

26. An apparatus according to claim 13, further comprising an automatic power control holding unit for holding a control of said automatic power control unit for a light emission driving period of time when said laser diode is light emission driven by said light emission fine adjustment processing unit.

27. An optical storage apparatus comprising:

a laser diode for emitting a light beam;

light emission current source circuit for supplying driving currents according to a plurality of powers to said laser diode;

an automatic power control unit for controlling a light emitting power of said laser diode to a specified target power;

a monitoring detector for receiving a laser beam from said laser diode and detecting a measuring power;

a monitoring power measuring unit for obtaining a monitor current derived from said monitoring detector as a power measurement value;

a light emission fine adjustment processing unit for supplying a light emitting current of a predetermined testing power to said laser diode in a state where an on-track control is validated after seeking to a predetermined test zone, for driving said laser diode to emit light, for adjusting said light emitting current so that said measuring power is equal to said target power, and for obtaining a relation between said light emitting current and said light emitting power on the basis of said adjustment result;

a test zone confirming unit for discriminating whether a present position of said light beam lies within a range of said test zone or not at the time of the start of the light emission adjustment of said laser diode by said light emission fine adjustment processing unit and for activating said light emission adjustment when the present position lies within said test zone range; and a light emission timing control unit for, in the case where said laser diode is light emission adjusted by said light emission fine adjustment processing unit, allowing the light emission adjustment of said laser diode to be executed in only a data field while avoiding an ID field with respect to each of track sectors which are on-track controlled.

28. An apparatus according to claim 27, wherein said light emission fine adjustment processing unit sequentially instructs the light emission at predetermined testing powers to said light emission current source circuit in a state where an on-track control is validated after seeking to a predetermined zone, drives said laser diode to emit light, adjusts an instruction value for said light emission current source circuit so that said measuring power is equal to said target power, and obtains a relation between the instruction value for said light emission current source circuit and an arbitrary light emitting power on the basis-of said adjustment results, said apparatus further comprises a subtraction current source circuit for subtracting a specified subtraction current corresponding to a difference between said light emitting power and said target power from a photosensing current of said monitoring detector, converting a resultant current to said monitor current, and feeding back said monitor current to said automatic power control unit, said monitoring power measuring unit reads said monitor current derived from said subtraction current source circuit as a power measurement value, and said light emission fine adjustment processing unit sequentially instructs the light emission at testing powers at at least two predetermined points to said light emission current source circuit in a state where the on-track control is validated after seeking to the predetermined test zone, drives said laser diode to emit light to emit light, instructs specified subtraction currents corresponding to said testing powers at said two points to said subtraction current source circuit, adjusts the instruction value of said light emission current source circuit so that the measuring power of said monitoring power measuring unit is equal to said target power, and obtains the relation between the instruction value of said light emission current source circuit and said arbitrary light emitting power on the basis of said adjustment result.

29. An apparatus according to claim 27, further comprising an automatic power control holding unit for holding a control of said automatic power control unit for a light emission driving period of time when said laser diode is light emission driven by said light emission fine adjustment processing unit.

* * * * *

UNITED STATES PATENT AND TRADEMARK OFFICE
CERTIFICATE OF CORRECTION

PATENT NO. : 6,072,761
DATED : June 6, 2000
INVENTOR(S) : Hiroshi Tani

It is certified that error appears in the above-indentified patent and that said Letters Patent is hereby corrected as shown below:

Column 32, line 55, please delete "light".

Column 32, line 56, please delete "emission driven" and insert --driven to emit light-- therefor.

Signed and Sealed this

Twenty-second Day of May, 2001

*Attest:*

NICHOLAS P. GODICI

*Attesting Officer*     *Acting Director of the United States Patent and Trademark Office*